United States Patent
Yamamoto et al.

(10) Patent No.: US 6,825,289 B2
(45) Date of Patent: Nov. 30, 2004

(54) METHOD FOR PRODUCING CHEMICAL REACTIVE SUBSTANCE AND POLYCARBOXYLIC ACID PRODUCED THEREBY

(75) Inventors: Masaya Yamamoto, Yokohama (JP); Toru Uno, Yokohama (JP); Yoshiyuki Onda, Tokyo (JP); Koichiro Nagare, Kawasaki (JP); Minoru Miyagawa, Miura (JP)

(73) Assignee: Nippon Shokubai Co., Ltd., Osaka (JP)

( * ) Notice: Subject to any disclaimer, the term of this patent is extended or adjusted under 35 U.S.C. 154(b) by 81 days.

(21) Appl. No.: 10/332,583

(22) PCT Filed: Apr. 2, 2002

(86) PCT No.: PCT/JP02/03284

§ 371 (c)(1),
(2), (4) Date: Mar. 21, 2003

(87) PCT Pub. No.: WO02/081608

PCT Pub. Date: Oct. 17, 2002

(65) Prior Publication Data

US 2003/0158077 A1 Aug. 21, 2003

(30) Foreign Application Priority Data

Apr. 2, 2001 (JP) .................................... 2001-103822

(51) Int. Cl.7 ............................ C08F 2/01; C11D 17/04
(52) U.S. Cl. .................. 526/71; 528/301; 528/302; 528/306; 525/437; 525/444; 252/367.1; 252/381; 252/384
(58) Field of Search ....................... 526/71; 528/301, 528/302, 303, 306; 525/437, 444; 252/367.1, 381, 384

(56) References Cited

FOREIGN PATENT DOCUMENTS

| JP | 57-111304 A | 7/1982 |
|----|-------------|--------|
| JP | 61-126103 A | 6/1986 |
| JP | 61-271248 A | 12/1986 |
| JP | 6-211904 A | 8/1994 |
| JP | 2001-2778 A | 1/2001 |
| JP | 2001-247605 A | 9/2001 |

Primary Examiner—Samuel A. Acquah
(74) Attorney, Agent, or Firm—Sughrue Mion, PLLC (57) ABSTRACT

The present invention is to provide a production method of chemical reactive substances with stable quality by which solidification, gel formation, and the resulting blockade within material injection nozzles are prevented, and contamination of a reaction system with the gelled matter is prevented, as well as occurrence of problems on a production process due to the gelled matter is suppressed, when the chemical reactive substances are produced by injecting the liquid materials containing reactive substances having unsaturated double bonds into the reaction vessel through the material injection nozzles of the reaction vessel.

The present invention is a production method of a chemical reactive substance
which comprises injecting a liquid material containing a reactive substance having an unsaturated double bond into a reaction vessel through a material injection nozzle of said reaction vessel and causing a reaction at a reaction temperature of not less than 50° C.,
said production method of the chemical reactive substance including a step of removing at least a part of residual liquid remained in the material injection nozzle from inside of the material injection nozzle.

20 Claims, 2 Drawing Sheets

METHOD FOR PRODUCING CHEMICAL REACTIVE SUBSTANCE AND POLYCARBOXYLIC ACID PRODUCED THEREBY

TECHNICAL FIELD

The present invention relates to a production method of chemical reactive substances, polycarboxylic acids produced thereby as well as cement additives, dispersants, builders for powder detergents and builders for liquid detergents.

PRIOR ART

A production method of chemical reactive substances which comprises reacting a liquid material containing reactive substances having unsaturated double bonds is used for production of polymers by polymerization reaction of unsaturated double bonds, and for production of chemical reactive substances having unsaturated double bonds that can be used as materials for production of polymers, and is applied in various industrial fields as a production method of industrially useful chemical products. For example, it is used in order to produce cement additives (cement dispersants), builders for powder detergents, builders for liquid detergents, dispersants, for example, pigment dispersants for dispersing calcium carbonate, carbon black and ink, scale inhibitors, dispersants for gypsum and water slurries, dispersants for coal-water slurries (CWM), thickeners, and other chemical products.

In order to produce substances industrially efficient and with large quantities using such a production method, for example, chemical reactive substances are produced by injecting a liquid material containing reactive materials having unsaturated double bonds into a reaction vessel through a material injection nozzle of the reaction vessel, and effecting the reaction. However, when starting materials, such as a liquid material containing reactive materials having unsaturated bonds, are supplied into said reaction vessel through the material injection nozzle of the reaction vessel, there has been a problem such that starting materials remained in the material injection nozzle, thereby the solidified matter and/or gelled matter may block the material injection nozzle, or the gelled matter may be contaminated into the reaction system.

If the material injection nozzle is blocked by the gelled matter, feeding of starting materials into the reaction vessel becomes impossible, and production cannot be carried out appropriately, as well as such a problem that the gelled matter formed is contaminated into the reaction system may occur. Moreover, if the gelled matter is contaminated into the reaction system, it becomes difficult to produce chemical reactive substances with stable quality. Further, blockage due to the gelled matter will cause a trouble of production facilities, such as pump stop, in a transfer step of produced chemical reactive substances and a feeding step, whereby stable production is disturbed. Therefore, the device is needed for industrially stable production of chemical reactive substances with excellent quality using liquid materials containing reactive substances having unsaturated double bonds.

SUMMARY OF THE INVENTION

In view of the above-mentioned state of the art, an object of the present invention is to provide a production method of chemical reactive substances with stable quality by which solidification, gel formation, and the resulting blockage within material injection nozzles are prevented, and contamination of a reaction system with the gelled matter is prevented, as well as occurrence of problems on a production process due to the gelled matter is suppressed, when the chemical reactive substances are produced by injecting the liquid materials containing reactive substances having unsaturated double bonds into the reaction vessel through the material injection nozzles of the reaction vessel.

The present inventors made the investigation on a production method of chemical reactive substances which comprises injecting liquid materials containing reactive substances having unsaturated double bonds into a reaction vessel through material injection nozzles and first noticed that gelled matters are formed from starting materials remained in the material injection nozzles (1) when a reaction is carried out at reaction temperature of not less than 50° C. using liquid materials containing reactive substances having unsaturated double bonds, (2) when liquid materials containing polyalkylene glycol monomers (I) and carboxylic acid monomers (II) are used, (3) when liquid materials containing carboxylic acid monomers (II) are used, and (4) when liquid materials containing a carboxylic acid monomers (II) and polyalkylene glycol (III) are used. Moreover, they also noticed that the gelled matters block the material injection nozzles, and are contaminated into a reaction system, and, as a result, quality of products is deteriorated or problems are occurred in the production process. In such cases, they found out that the above-mentioned problems can be solved by including a step of removing at least a part of residual liquid remained in the material injection nozzles from the inside of the material injection nozzles. Further, they found out that, when the substance removed from inside of the material injection nozzles in such a step is a polyalkylene glycol (III), effects of the present invention are suitably manifested. Furthermore, they also found out that the formation of the gelled matter within the material injection nozzles is efficiently prevented when at least a part of residual liquid in the material injection nozzles is purged and extruded from the material injection nozzles using one or two or more of gaseous substances, water and starting materials charged other than the material concerned injected through the material injection nozzles. Therefore, they found out that the above-mentioned production method is effective in order to produce industrially useful chemical products with stable quality, that the production method is especially effective when applied for production of polycarboxylic acids and the polycarboxylic acids are applied in cement additives, dispersants, builders for powder or liquid detergents, and thus the present invention is accomplished.

Accordingly, the present invention is a production method of a chemical reactive substance which comprises injecting a liquid material containing a reactive substance having an unsaturated double bond into a reaction vessel through a material injection nozzle of said reaction vessel and causing a reaction at a reaction temperature of not less than 50° C.,
said production method of the chemical reactive substance including a step of removing at least a part of residual liquid remained in the material injection nozzle from inside of the material injection nozzle.

The present invention is also a production method of a chemical reactive substance containing a polycarboxylic acid which comprises carrying out copolymerization of a liquid material containing a polyalkylene glycol monomer (I) and a carboxylic acid monomer (II) in a reaction vessel, said polyalkyleneglycol monomer (I) and said carboxylic acid monomer (II) being injected, individually or as a mixed solution, into the reaction vessel through a material injection nozzle of said reaction vessel, and said production method of the chemical reactive substance including a step of removing at least a part of residual liquid remained in the material injection nozzle from inside of the material injection nozzle.

The present invention is also a production method of a chemical reactive substance containing a polycarboxylic acid which comprises carrying out polymerization of a liquid material containing a carboxylic acid monomer (II) in a reaction vessel, said carboxylic acid monomer (II) being injected into the reaction vessel through a material injection nozzle of said reaction vessel, and said production method of the chemical reactive substance including a step of removing at least a part of residual liquid remained in the material injection nozzle from inside of the material injection nozzle.

Further, the present invention is directed to a production method of a chemical reactive substance containing a polyalkylene glycol monomer (I)

which comprises carrying out esterification of a liquid material containing a carboxylic acid monomer (II) and a polyalkylene glycol (III) in a reaction vessel, said carboxylic acid monomer (II) and said polyalkylene glycol (III) being injected, individually or as a mixed solution, into the reaction vessel through a material injection nozzle of said reaction vessel, and said production method of the chemical reactive substance including a step of removing at least a part of residual liquid remained in the material injection nozzle from inside of the material injection nozzle.

Further, the present invention is a polycarboxylic acid obtainable by copolymerizing a liquid material containing a polyalkylene glycol monomer (I) and a carboxylic acid monomer (II), which is produced by said production method of a chemical reactive substance.

The present invention is also a polycarboxylic acid obtainable by polymerizing a liquid material containing a carboxylic acid monomer (II), which is produced by said production method of a chemical reactive substance.

The present invention is also a cement additive comprising said polycarboxylic acid.

The present invention is also directed to a dispersant comprising said polycarboxylic acid.

The present invention is further a builder for a powder detergent comprising said polycarboxylic acid.

Finally, the present invention is a builder for a liquid detergent comprising said polycarboxylic acid.

EXPLANATION OF THE NUMERICAL SYMBOLS

1 Injection of a carboxylic acid monomer (II)
2 Injection of a polyalkylene glycol (III)
3 Injection of a dehydration solvent
4 Injection of an esterification catalyst
5 Injection of pure water
6 Injection of a mixed solution of polyalkylene glycol monomer (I) and carboxylic acid monomer (II)
7 Injection of an initiator aqueous solution
8 Injection of a polyalkylene glycol monomer (I)
9 Blow of $N_2$ (nitrogen gas)
10 Injection of carboxylic acid monomer (I) or a dehydration solvent
11 Residual liquid of polyalkylene glycol (III)
12 Injection of a polyalkylene glycol (III) or carboxylic acid monomer (II) or polyalkylene glycol monoalkenyl ether
13 Material injection nozzle
14–18 Valves
19 An enlarged section conceptual diagram of a material injection nozzle

DETAILED DESCRIPTION OF THE INVENTION

The present invention is described in detail hereinafter.

In the production method of a chemical reactive substance of the present invention, the chemical reactive substances are produced by using liquid materials containing reactive substances having unsaturated double bonds. The reactive substances having unsaturated double bonds are not particularly limited, as long as they are compounds or polymers having a function that can form a gelled matter due to the reaction of unsaturated double bonds. Moreover, liquid materials are one of starting materials charged into a reaction vessel and viscosity and like properties are not particularly restricted as long as they are in a liquid form. For example, they may be uniform or not uniform. Moreover, as for such liquid materials, there may be (1) a case where reactive substances having unsaturated double bonds are contained as essential components, and (2) a case where reactive substances having unsaturated double bonds are not contained, but the liquid materials have good compatibility with the reactive substances having unsaturated double bonds and can adsorb the reactive substances having unsaturated double bonds volatilized during the reaction. In the former case, other components may or may not be contained. In cases where other components are contained, effects of the present invention is fully demonstrated when the reactive substances having unsaturated double bonds are contained in such amount that the gelled matter is formed to cause problems in the conventional production method. Furthermore, the term "the chemical reactive substance" means chemical products (including so-called intermediates) produced from materials for production comprising liquid materials.

In the production method of a chemical reactive substance of the present invention, chemical reactive substances are produced by injecting the above-mentioned liquid material into the reaction vessel through the material injection nozzle of the reaction vessel, and causing a chemical reaction. The method is applied in (1) a case where reaction is carried out at a reaction temperature of not less than 50° C., (2) a case where the liquid material is a substance containing a polyalkylene glycol monomer (I) and a substance containing a carboxylic acid monomer (II), or a substance containing a polyalkylene glycol monomer (I) and a carboxylic acid monomer (II), and they are copolymerized to produce a chemical reactive substance containing a polycarboxylic acid, (3) a case where the liquid material is a substance containing a carboxylic acid monomer (II), and it is polymerized to produce a chemical reactive substance containing a polycarboxylic acid, and (4) a case where the liquid raw material is a substance containing a carboxylic acid monomer and a substance containing polyalkylene glycol (III), or a substance containing a carboxylic acid monomer (II) and polyalkylene glycol (III), and they are esterified to produce a chemical reactive substance containing the polyalkylene glycol monomer (I). These raw materials may be used independently, or two or more species may be used in combination. In this specification, the term "polyalkyleneglycol monomer (I)" means an ester obtainable by esterification reaction in the above-mentioned case (4), however, the polyalkyleneglycol monomer (I) used in the above-mentioned case (2) is not limited to the ester. In the present invention, the substance removed from inside of the material injection nozzle in the above-mentioned step is preferably polyalkylene glycol (III), since effects of suppressing formation of the gelled matter within material injection nozzle are most effectively manifested.

Conventionally, when a reaction is carried out at a reaction temperature of not less than 50° C. as in the above-mentioned case (1), heat is given to the material injection nozzles of the reaction vessel, and the reactive substances having unsaturated double bonds in the liquid material remained as a residual liquid in the material injection nozzles are polymerized to form gelled matter, and in the above-mentioned case (2), the gelled matter is formed due to polymerizability of the polyalkyleneglycol monomers (I) and carboxylic acid monomers (II) in the liquid material remained as a residual liquid in the material injection nozzles. In the above-mentioned case (3), the gelled matter is formed due to polymerizability of the carboxylic acid monomers (II) in the liquid material remained in the material injection nozzle. Also, in the above-mentioned case (4), the polyalkylene glycols (III) having high viscosity adhere inside of the material injection nozzle, and the volatilized carboxylic acid monomers (II) are adsorbed to the adhered residual liquid and then gelled matter is formed due to polymerizability of the carboxylic acid monomers (II), or the gelled matter is formed due to polymerizability of the carboxylic acid monomers (II) in the liquid materials remained as a residual liquid in the material injection nozzle. The above-mentioned case (2), (3) and (4) of the present invention may be suitably applied when the reaction is carried out under the same reaction conditions as the case of the above-mentioned (1), that is at a reaction temperature of not less than 50° C.

As the above-mentioned polyalkylene glycol monomers (I), there may be suitably mentioned esterification products of a (meth) acrylic acid and an alkoxy polyalkylene glycol represented by the following general formula (1);

in the formula, $R^1$ represents a hydrocarbon group of 1 to 30 carbon atoms; $R^2O$ each represents an oxyalkylene group of 2 to 18 carbon atoms, when a plurality of $R^2O$ exists, each repeating unit of $R^2O$ may be the same or different, and when $R^2O$ contains two or more species, the form of addition of each repeating unit of $R^2O$ is not especially limited and may be block addition or random addition; $R^3$ represents a hydrogen atom or a methyl group; and n represents an average molar number of addition of the oxyalkylene group represented by $R^2O$, and is a number of 0 to 300, and polyalkylene glycol monoalkenyl ethers represented by the following general formula (2);

in the formula, $R^4$ represents an alkenyl group of 2 to 5 carbon atoms; and $R^2O$ and n are the same as defined above.

As the above-mentioned polyalkylene glycols (III), there may be suitably mentioned polyalkylene glycols represented by the following general formula (3);

in the formula, $R^1$, $R^2O$, and n are the same as defined above.

In the above-mentioned general formulae, as $R^1$, there may be suitably mentioned alkyl groups, such as methyl group, ethyl group, n-propyl group, isopropyl group, n-butyl group, tert-butyl group, pentyl group, hexyl group, octyl group, nonyl group, 2-ethyl hexyl group, decyl group, dodecyl group, undecyl group, tridecyl group, tetradecyl group, pentadecyl group, hexadecyl group, heptadecyl group, octadecyl group, nonadecyl group, eicosyl group, heneicosyl group, docosyl group etc.; aryl groups such as phenyl group; alkylphenyl groups such as benzyl and nonylphenyl group; cycloalkyl groups, such as cyclohexyl group; alkenyl group; and alkynyl group etc. Among them, linear or branched alkyl group and aryl group of 1 to 18 carbon atoms are preferable. Methyl group, ethyl group, propyl group, butyl group, and phenyl group are more preferable. Moreover, as $R^2O$, oxyethylene group, oxypropylene group, oxybutylene group, oxystyrene group and the like may be suitably mentioned, and among them, oxyethylene group, oxypropylene group, and oxybutylene group are preferable.

When the chemical reactive substance is used as a starting material for production of the polymer for cement additives, for example, in the case of the general formula (1) and (3), a range of the above-mentioned n is preferably not less than 2 and not more than 300. More preferably, it is not less than 5 and not more than 200, still more preferably not less than 8 and not more than 150. In the case of the general formula (2), it is preferable not less than 15 and not more than 300, more preferably not less than 20 and not more than 200, still more preferably not less than 25 and not more than 150. When the chemical reactive substance is used as a thickening agent or the like, in the case of the general formula (1) and (3), it is preferably not less than 10 and not more than 250, more preferably not less than 50 and not more than 200. In the case of the general formula (2), it is preferably not less than 15 and not more than 250, more preferably not less than 50 and not more than 200. The average molar number of addition means an average value of moles of the repeating unit in one mole of the compound concerned.

In the case of the above-mentioned case (3), namely when a liquid material containing a reactive substance comprising the carboxylic acid monomer (II) and the polyalkylene glycol (III) is esterified as mentioned later herein, when n is 0, the above-mentioned $R^1$ and $R^4$ each is preferably a hydrocarbon group of not less than 4 carbon atoms from viewpoints of solubility with water and a boiling point. When n is 0, the starting material having a low boiling point evaporates with generated water to be dissolved therein, and as a result, a part of the starting materials concerned are distilled off out of the reaction system to lower an yield of the objective chemical reactive substance.

As the above-mentioned carboxylic acid monomers (II), there may be suitably mentioned (meth)acrylic acid monomers represented by the following general formula (4);

in the formula, $R^5$ and $R^6$ may be the same or different and each represents a hydrogen atom or a methyl group; and M represents a hydrogen atom, a monovalent metal atom, a divalent metal atom, an ammonium group, or a protonated organic amine.

and maleic acid monomers represented by the following general formula (5);

in the formula, X represents $—OM^2$ or $—Y—(R^7O)_q—R^8$; $M^1$ and $M^2$ may be the same or different and each represents a hydrogen atom, a monovalent metal atom, a divalent metal atom, an ammonium group or a protonated organic amine; —Y— represents —O— or —NH—; $R^7O$ represents an oxyalkylene group of 2 to 18 carbon atoms, when a plurality of $R^7O$ exists, each repeating unit of $R^7O$ may be the same or different, and when $R^7O$ contains two or more species, the form of addition of each repeating unit of $R^7O$ is not especially limited and may be block addition or random addition; $R^8$ represents a hydrogen atom or an alkyl group of 1 to 30 carbon atoms, a phenyl group, an aminoalkyl group, an alkylphenyl group, or a hydroxylalkyl group where number of carbon atoms of the alkyl groups in the aminoalkyl group, alkylphenyl group, and hydroxylalkyl group is 1 to 30; q is an average molar number of addition of oxyalkylene group and is a number of 1 to 300; and inclusive of an oxygen atom to which $M^1$ is bound and a carbon atom to which X is bound are bound together to constitute an acid anhydride group (—CO—O—CO—) and in this case, $M^1$ and X will not exist.

The production method of a chemical reactive substance of the present invention includes a step in which at least a part of residual liquid remained in the material injection nozzle is removed from inside of the material injection nozzle. In this step, at least a part of residual liquid remained in the material injection nozzle is removed from inside of the material injection nozzle in such extent that problems due to the formation of the gelled matter in the residual liquid remained in the material injection nozzle do not occur. However, it is preferable that the residual liquid maybe removed in such extent that whole residual liquid is removed. A method for removing residual liquid is not especially limited, as long as residual liquid is removed from inside of the material injection nozzles. In the present invention, the removal is preferably carried out by selecting any one or two or more of following steps properly according to species of the liquid material, form of the reaction and the like; (1) the above-mentioned step is carried out by purging and extruding at least a part of residual liquid in the material injection nozzle from the material injection nozzle using a gaseous substance; (2) the above-mentioned step is carried out by purging and extruding at least a part of residual liquid in the material injection nozzle from the material injection nozzle using water; and (3) the above-mentioned step is carried out by purging and extruding at least a part of residual liquid in the material injection nozzle from the material injection nozzle using a starting material charged other than the material injected through the material injection nozzle. In the above-mentioned case (1), as the gaseous substance, air, mixed gas of $N_2$ (nitrogen) and air, and inert gas such as $N_2$ (nitrogen) gas, may suitably be mentioned, and inert gas such as $N_2$ gas is preferable.

In these (1) to (3), at least a part of residual liquid will be extruded into the reaction vessel from the material injection nozzle, and it will be used as a starting material for production.

Preferred Embodiments of the Invention

Embodiments of the present invention will be described hereinafter. These embodiments are exemplification of preferable embodiments of the present invention, and the present invention is not limited to these embodiments.

The above-mentioned preferable embodiment about a removing method of residual liquid in a material injection nozzle in the present invention is described using a conceptual diagram.

Figure 1:
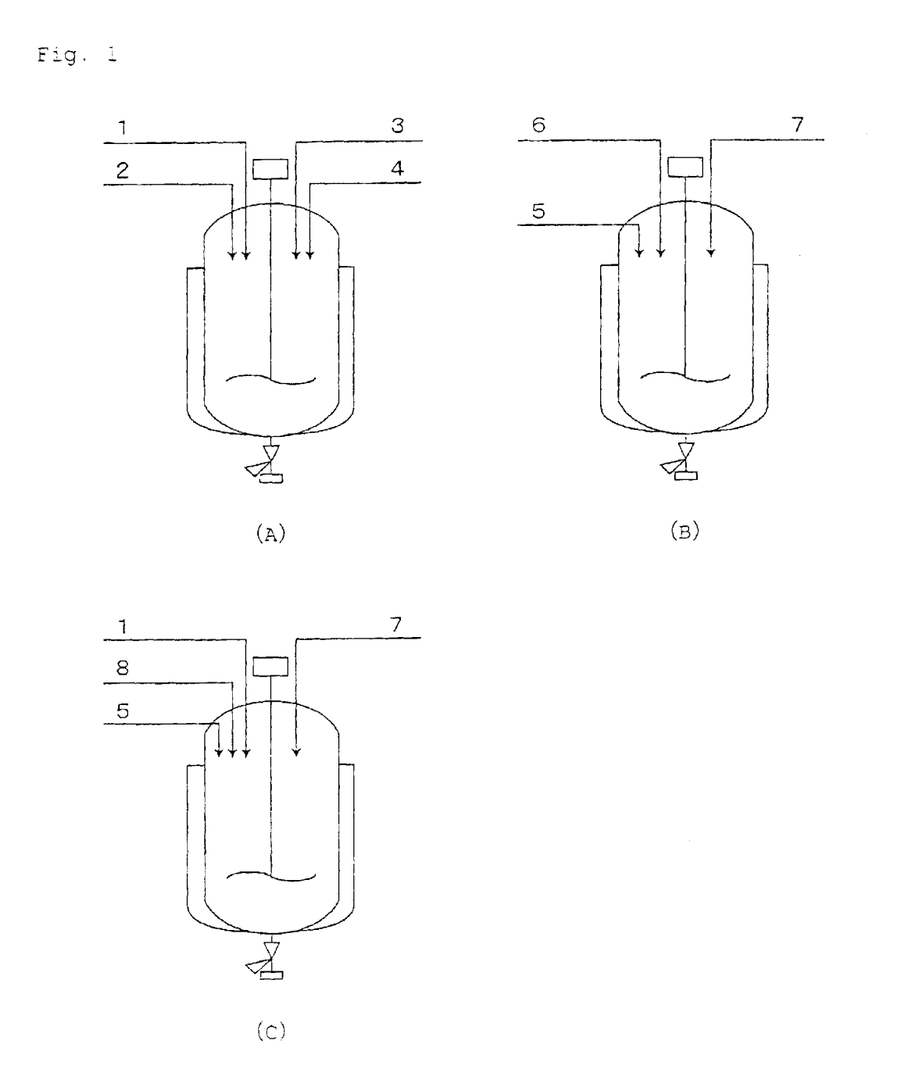
FIG. 1 represents cross section conceptual diagrams which illustrates an embodiment of the invention when a liquid material is injected into a reaction vessel through a material injection nozzle of the reaction vessel.

In FIG. 1, (A) shows a cross section conceptual diagram of a reaction vessel according to the embodiment where a liquid material containing carboxylic acid monomers (II) and polyalkylene glycols (III) is esterified to produce chemical reactive substances containing polyalkylene glycol monomers (I), each of (B) and (C) show a cross section conceptual diagram of a reaction vessel according to the embodiment where a liquid material containing polyalkyleneglycol monomers (I) and carboxylic acid monomers (II) is copolymerized to produce chemical reactive substances containing polycarboxylic acids.

These figures show notionally that these starting materials are injected into the reaction vessel through the material injection nozzles of the reaction vessel. In this case, the starting materials may be injected using one material injection nozzle, or may be injected using two or more material injection nozzles. In (A) of FIG. 1, the carboxylic acid monomer (II) and the polyalkyleneglycol (III) are injected independently into the reaction vessel through the material injection nozzles, in (B), the polyalkylene glycol monomer (I) and the carboxylic acid monomer (II) are injected as a mixed solution, and in (C), the polyalkylene glycol monomer (I) and the carboxylic acid monomer (II) are injected independently into the reaction vessel through the material injection nozzles.

The reaction method of these embodiments will be described in detail later herein.

In FIG. 1, as methods of removing residual liquid in the material injection nozzle after each starting material is injected into the reaction vessel through the material injection nozzle, when the starting materials are carboxylic acid monomers (II) or substances containing carboxylic acid monomers (II), the method which comprises purging inside of the material injection nozzle using the gaseous substance is preferred. Moreover, when the starting materials are polyalkylene glycols (III) or substances containing polyalkylene glycols (III), inside of the material injection nozzle is preferably purged by using dehydration solvents, such as cyclohexane and xylene, or using carboxylic acid monomers (II), such as acrylic acid and methacrylic acid. When purged by using the carboxylic acid monomers (II), it is preferable that the inside of the material injection nozzle is further purged by the gaseous substance. When the starting materials are polyalkylene glycol monomers (I) or substances containing polyalkylene glycol monomers (I), inside of the material injection nozzle is preferably purged by using PW (the abbreviated name of Pure Water; water) or using the gaseous substance. Furthermore, when the mixed solution is a substance containing polyalkylene glycol monomers (I) and carboxylic acid monomers (II), the method which comprises purging the material injection nozzle using PW is preferred, and when the above polyalkylene glycol monomers (I) are polyalkyleneglycol monoalkenyl ethers, it is preferable that inside of the material injection nozzle is purged by using the gaseous substance.

In a case of the above-mentioned FIG. 1(A), purge can be carried out using PW in order to remove polyalkylene glycols (III) from the inside of the material injection nozzle, but since a dehydration step is carried out as a subsequent step, as is mentioned later, it is preferable that not large amount of PW is injected. Moreover, although an effect is expected to some extent by blowing with the gaseous substance, there is also a possibility that residual liquid on a wall surface of a pipe may not be purged completely, because a polyalkyleneglycol (III) is a viscous substance. For this reason, blowing with the gaseous substance is preferably carried out repeatedly.

When a carboxylic acid monomer (II) is MAah (abbreviated name for maleic anhydride) in the above-mentioned FIG. 1 (3), use of PW in removal of residual liquid containing MAah in the material injection nozzle results in solidification of maleic acid produced by a reaction between MAah and PW and thereby blockage of the material injection nozzles. Therefore, it is preferable that the inside of the material injection nozzle is not purged with PW. In this case, even if a purge is carried out with a polyalkylene glycol monomer (I), it will cause the formation of impurities, such as half esters, and therefore it is preferred that the inside of the material injection nozzle is not purged with such a starting material.

Figure 2:
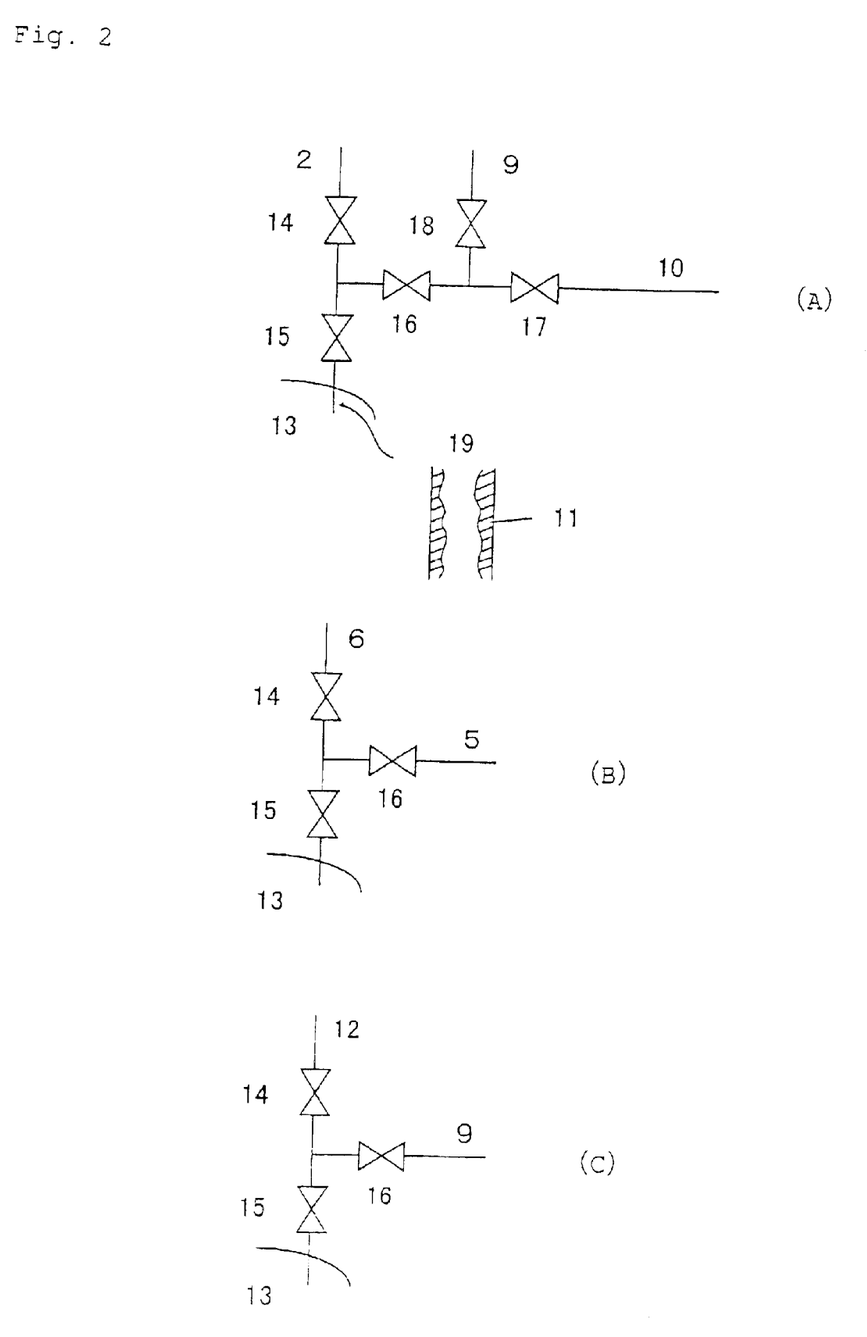
FIG. 2 represents cross section conceptual diagrams which shows the vicinity of the material injection nozzle of the reaction vessel in a preferable embodiment of the invention regarding a structure of the material injection nozzle and a purge procedure in the present invention.

FIG. 2, (A) to (C) each represents the cross section conceptual diagram which shows the vicinity of the material injection nozzle of the reaction vessel in the preferable embodiment regarding the material injection nozzle structure and the purge procedure in the case of the above-mentioned FIG. 1.

In FIG. 2(A), a preferable case of the embodiment using a polyalkylene glycol (III) having high viscosity in FIG. 1(A) is shown. The process is carried out as follows; valves 14 and 15 are opened to inject a polyalkylene glycol (III), valve 14 is closed after a predetermined amount is injected, valves 16 and 17 are opened and a carboxylic acid monomer (II) is injected to extrude the polyalkyleneglycol (III) remained in the material injection nozzle into the reaction vessel. Then, after a predetermined amount is injected, the valve 17 is closed, a valve 18 is opened to extrude the carboxylic acid monomer (II) remained in the nozzle into the reaction vessel by blowing with a gaseous substance, and valves 15, 16, and 18 are closed. When a dehydration solvent is used to purge instead of using the carboxylic acid monomer (II), the blowing with the gaseous substance is unnecessary.

In FIG. 2(A), a state of the polyalkylene glycol (III) remained in the material injection nozzle is shown by an enlarged section conceptual diagram, when the polyalkylene glycol (III) is injected into the reaction vessel through the material injection nozzle. When the polyalkylene glycol (III) having high viscosity among others is used, as shown in the figure, it remains in such a state that it is thickly adhered to a wall surface in the material injection nozzle. Accordingly, a carboxylic acid derived monomer (II) volatilized during the reaction is adsorbed to the adhered polyalkylene glycol to polymerize, and the gelled matter is formed. However, in the present invention, since the material to be adhered is removed as mentioned hereinabove, troubles in the process such as blockade of the material injection nozzle due to the gelled matter or deterioration of the quality of the chemical reactive substance may be solved.

In FIG. 2(B), a preferable case of the embodiment in FIG. 1(B) is shown. The process is carried out as follows; valves 14 and 15 are opened to inject a mixed solution containing a polyalkyleneglycol monomer (I) and a carboxylic acid monomer (II), the valve 14 is closed after a predetermined amount is injected, a valve 16 is opened and PW is injected to extrude the mixed solution containing the polyalkylene glycol monomer (I) and the carboxylic acid monomer (II) remained in the material injection nozzle into a reaction vessel and valves 15 and 16 are closed.

In FIG. 2(C), preferable cases of an embodiment in which a polyalkylene glycol (III) having low viscosity is used in FIG. 1(A) and of an embodiment in FIG. 1(C) are shown. The process is carried out as follows; valves 14 and 15 are opened to inject a starting material polyalkylene glycol (III) or carboxylic acid monomer (II) or polyalkylene glycol monoalkenyl ether, the valve 14 is closed after a predetermined amount is injected, a valve 16 is opened and the starting material remained in the material injection nozzle is extruded by blowing with a gaseous substance into a reaction vessel, and valves 15 and 16 are closed.

In FIGS. 2(A) to (C), a nozzle diameter of the material injection nozzle through which the liquid material is injected into the reaction vessel is preferably not less than 5 mm and not more than 60 mm, when a capacity of the reaction vessel is about 10 to 30 m$^3$. A nozzle with an optimal diameter is selected according to an injecting amount and injection time. Moreover, it is preferable that the material injection nozzles are installed in a reaction vessel with such manner that a top of the material injection nozzle projects into the reaction vessel. When the top of the material injection nozzle is not projected into the reaction vessel, that is, when the top of material injection nozzle is located on the wall surface inside of the reaction vessel, a liquid dripping occurs, thereby liquid material is adhered to remain on the wall surface in the reaction vessel, and the gelled matter may possibly formed. Therefore, contamination of the gelled matter into the reaction system can surely be prevented by disposing the top of the material injection nozzle to be projected in the reaction vessel in a position distant from the wall surface of the reaction vessel, and thereby preventing the occurrence of a liquid dripping.

In the production method of a chemical reactive substance according to the present invention, an embodiment in which a liquid material containing a carboxylic acid monomer (II) and a polyalkylene glycol (III) is esterified is described in the following.

In carrying out the esterification reaction according to the present invention, a dehydration reaction step is carried out. Such a dehydration reaction step comprises using a dehydration reaction apparatus comprising a reaction vessel, a condenser and a connecting pipe joining said reaction vessel with said condenser, and a water separator joined with said condenser via a feeding pipe. In such dehydration reaction apparatus, the dehydration reaction is carried out in the reaction vessel while a distillation procedure is carried out using the condenser and the water separator. In cases where the dehydration reaction involves a chemical equilibrium in the dehydration reaction step, the reaction proceeds well when the byproduct water resulting from the reaction is removed from the reaction vessel. In such a step, the following procedures are carried out: (1) the procedure, for facilitating the removal of the water formed in the reaction vessel, which comprises admixing a dehydration solvent with the reaction solution and causing azeotropy of said dehydration solvent and water to give a vaporized distillate, (2) the procedure which comprises allowing said distillate to pass through a connecting pipe joining the reaction vessel with the condenser and to enter the condenser followed by condensing and liquefying the distillate in said condenser, (3) the procedure which comprises separating the condensed and liquefied distillate into the dehydration solvent and water in the water separator connected with the condenser and (4) the procedure which comprises refluxing the dehydration solvent separated into the reaction vessel.

The above reaction vessel has the same meaning as the reactor, reaction chamber, reaction kettle, etc. and includes all vessels in which an esterification reaction can be carried out. The shape of the reaction vessel is not particularly restricted but may be polygonal pillar-like, cylindrical, or the like. In view of the agitating efficiency, handleability, versatility and the like, the cylindrical type is preferred, however. It may have or not have a baffle plate. As the capacity of the reaction vessel, when production is carried out in normal industrial scale, not less than 1 $m^3$ and not more than 50 $m^3$ is preferred, more preferably not less than 5 $m^3$ and not more than 40 $m^3$. The material of construction of the inside of such reaction vessel may be any of such known materials, but SUS is preferred. Preferred from the viewpoint of corrosion resistance are SUS 304, SUS 316 and SUS 316L. More preferred are SUS 316, SUS 316L and the like. The inside of the reaction vessel may be processed by glass lining or the like, so that it may be rendered inert to the starting reactants and products. Generally, such reaction vessel is equipped with a stirrer so that the dehydration reaction can be carried out homogeneously and efficiently. The stirrer is not particularly restricted. The stirrer generally comprises an electric motor, a shaft and a stirring blade(s). The stirring blades may be optional in shape. As the stirring blades, there may be mentioned desk turbines, fan turbines, curved fan turbines, herringbone turbines, multistage fan turbine blades, Pfaudler type impellers, Brumagin type, angled blades, propeller type, multiple blades, anchor type, gate type, double ribbon blades, screw blades, max blend blades and so forth. Among them, multistage fan turbine blades and Pfaudler type impellers are preferred because of their versatility.

The above-mentioned condenser is an apparatus for condensing and liquefying the distillate coming from the reaction vessel, and the above condensation/liquefaction is effected by heat exchange between the distillate and an extratubular fluid, namely, a cooling fluid. The material of construction of such a condenser may be any of such known ones as SUS species, for example SUS 304, SUS 316 and SUS 316L, and carbon steel (CS) species. For further reducing the gelled matter formation, the condenser inside may be mirror-finished or glass-lined. In view of the cost required for such processing or maintenance, the condenser made of SUS species such as SUS 304, SUS 316 or SUS 316L is preferably used, more preferably SUS 316 or SUS 316L.

The heat transfer area of the above condenser may vary depending on the capacity of the reaction vessel and other factors but is preferably not lower than 50 $m^2$ and not higher than 500 $m^2$, more preferably not lower than 100 $m^2$ and not higher than 200 $m^2$, for a reaction vessel of 30 $m^3$, for instance. The cooling medium to be used in such condenser includes, for example, water or an oil.

The capacity of the above water separator may vary depending on the capacity of the reaction vessel, the amount of the distillate and other factors but is preferably not lower than 1 $m^3$ and not higher than 20 $m^3$, more preferably not lower than 3 $m^3$ and not higher than 10 $m^3$, for a reaction vessel of 30 $m^3$, for instance.

The starting material used in the above dehydration reaction comprises the liquid material containing the carboxylic acid monomer (II) and the polyalkyleneglycol (III) as essential and it may or may not comprises other component(s). When other component(s) is comprised, it preferably contains essential components as main components. In such dehydration step, esterification reaction proceeds between the above essential components and esters are produced as chemical reactive substances. In this specification, the above esters are sometimes called as esterification products.

In the above esterification reaction, a carboxyl group-containing unsaturated monomer other than (meth) acrylic acid can be used therewith. The carboxyl group-containing unsaturated monomer is a monomer having at least a carboxyl group and an unsaturated bond and specifically includes unsaturated monocarboxylic acids such as crotonic acid, tiglic acid, citronellic acid, undecylenic acid, elaidic acid, erucic acid, sorbic acid, linolic acid and the like; and unsaturated dicarboxylic acids such as maleic acid, fumaric acid, citraconic acid, mesaconic acid, itaconic acid and the like. These may be used singly or two or more of them may be used in combination.

The above esterification reaction is preferably carried out in the presence of a catalyst. An acid catalyst is suited and can proceed the reaction swiftly. Such an acid catalyst may also be used in the form of a hydrate and/or an aqueous solution and includes, for example, sulfuric acid, methanesulfonic acid, paratoluenesulfonic acid, paratoluenesulfonic acid hydrate, xylenesulfonic acid, xylenesulfonic acid hydrate, naphthalenesulfonic acid, naphthalenesulfonic acid hydrate, trifluoromethanesulfonic acid, "Nafion (trademark)" resin (product of Du Pont), "Amberlyst 15 (trademark)" resin, phosphotungstic acid, phosphotungstic acid hydrate and hydrochloric acid. These may be used singly or two or more of them may be used in combination.

Among the acid catalysts mentioned above, from the viewpoint of the azeotropic temperature with water and the dehydration solvent to be mentioned later herein or of the reaction temperature, those having a high boiling point at ordinary pressure (1,013 hPa), more specifically a boiling point at ordinary pressure of not lower than 150° C. are preferred, more preferably not lower than 200° C. As such acid catalysts, suitable catalysts are, for example, sulfuric acid (boiling point at ordinary pressure: 317° C.), paratoluenesulfonic acid (boiling point: 185 to 187° C./13.3 Pa (0.1 mmHg)), paratoluenesulfonic acid hydrate and methanesulfonic acid (boiling point: 167° C./1,333.2 Pa (10 mmHg)) and the like. Among them, the use of paratoluenesulfonic acid or paratoluenesulfonic acid hydrate is suitable.

The amount of use of the above acid catalyst may be selected within a range in which the desired catalytic activity can effectively be manifested. A level not more than 0.4 milliequivalent/g is preferred, however. If the amount of use exceeds 0.4 milliequivalent/g, the amount of a diester formed in the reaction system by the esterification reaction increases and when such esterification product is used in synthesizing polymers for use as cement additives, the product may show a decreased level of cement dispersing ability. The amount of use is more preferably not higher than 0.36 milliequivalent/g and not lower than 0.01 milliequivalent/g, still more preferably not higher than 0.32 milliequivalent/g and not lower than 0.05 milliequivalent/g. The amount of use of the acid catalyst (milliequivalents/g) is expressed by the value obtainable by dividing the number of equivalents (milliequivalents) of $H^+$ of the acid catalyst used for the reaction by the total amount (g) of the starting reactants charged, more specifically the value calculated by the following formula:

Amount of use of acid catalyst (milliequivalents/g)=$L/(M+N)$

L: Number of equivalents (milliequivalents) of $H^+$ of the acid catalyst
M: Weight (g) of the alcohol charged
N: Weight (g) of (meth)acrylic acid charged As regards the amount of use of the above acid catalyst, it is also preferred, from the viewpoint of the utility of the esterification product to serve as a starting material in the production of polymers to be applied to various uses as chemical products and of the prevention and suppression of the formation of a gelled matter adversely affecting the dispersing ability and other basic performance characteristics required in such applications, that the mass proportion X (% by mass) of the acid in the acid catalyst relative to the total mass of starting reactants and the mass proportion Y (% by mass) of water occurring as the hydrate in the acid catalyst and/or in the form of an aqueous solution satisfy the relation $0<Y<1.81X-1.62$.

The above relation is explained using a specific example. When paratoluenesulfonic acid monohydrate, for instance, is taken as an example, X (% by mass) is the mass proportion of paratoluenesulfonic acid relative to the total mass of starting reactants and Y (% by mass) is the mass proportion of the water occurring as the monohydrate relative to the total mass of starting reactants. It is to be noted that neither the acid constituent, for example the starting material (meth) acrylic acid, other than the acid catalyst nor such water as byproduct water formed by the esterification reaction can be taken into consideration as the above X and Y.

When the amount of use of the acid catalyst does not satisfy the above relation, for example when Y is 0, water occurring as the hydrate in the acid catalyst and/or in the form of an aqueous solution does not present and the amount of the gel formed in the reaction system during the esterification reaction increases and when such esterification product is used in synthesizing polymers for cement additives, their performance characteristics, for example the cement dispersing ability, may possible be deteriorated. If $Y \geq 1.81X-1.62$, the amount of the gel formed in the reaction system during the esterification reaction increases, leading to the same results as mentioned above.

The above acid catalyst may be added to the reaction system all at once or continuously or in portions. From the workability viewpoint, however, it is preferably charged into the reaction vessel all at once together with the starting reactants.

The above esterification reaction is preferably carried out in the presence of a polymerization inhibitor. By doing so, polymerization of the unsaturated carboxylic acid in the starting reactants and the product, namely esterification product, can be inhibited. As such polymerization inhibitors, those known in the art can be used, and there may be suitably mentioned phenothiazine, tri(p-nitrophenyl)methyl, di(p-fluorophenyl)amine, diphenylpicrylhydrazyl, N-(3-N-oxyanilino-1,3-dimethyl-butylidene)aniline oxide, benzoquinone, hydroquinone, methoquinone, butylcatechol, nitrosobenzene, picric acid, dithiobenzoyl disulfide, cupferron, copper(II) chloride, etc. These may be used singly or two or more of them may be used in combination. Among these, phenothiazine, hydroquinone and methoquinone are preferably used in view of their solubility. These can show their polymerization inhibiting ability very effectively in the dehydration reaction step as well in the step of distilling off the solvent, hence are very useful.

The amount of use of the above polymerization inhibitor is preferably not les than 0.001% by mass and not more than 1% by mass with the total charged amount of the starting materials for production, namely alcohol and acid, being taken as 100% by mass. If it is less than 0.001% by mass, the polymerization inhibiting effect will be manifested only to an unsatisfactory extent, hence it will become difficult to effectively inhibit the polymerization of the starting material charged and/or product. If it exceeds 1% by mass, the amount of the polymerization inhibitor remaining in the esterification product increases, which may possibly deteriorate the quality and performance characteristics. Further, the excessive portion added will not produce any extra effect, which may be disadvantageous from the economical viewpoint. An amount of not less than 0.001% by mass and not more than 0.1% by mass is more preferred.

The dehydration reaction procedure in the above esterification reaction may be carried out in the presence of a dehydration solvent while distilling byproduct water off out of the reaction system azeotropically together with the dehydration solvent, condensing and liquefying the azeotrope, separating and removing byproduct water and refluxing the dehydration solvent. By doing so, byproduct water formed by the esterification reaction can be efficiently removed azeotropically. Such dehydration solvent may be any solvent capable of forming an azeotrope with water. Thus, it includes benzene, toluene, xylene, cyclohexane, dioxane, pentane, hexane, heptane, chlorobenzene and isopropyl ether. These may be used singly or two or more of them may be used in combination. Among these, those having an azeotropic temperature with water of not higher than 150° C. are preferred and those having an azeotropic temperature of 60 to 90° C. are more preferred. As such dehydration solvents, there may specifically be mentioned cyclohexane, toluene, dioxane, benzene, isopropyl ether, hexane, heptane and the like. When the azeotropic temperature with water exceeds 150° C., the workability, inclusive of the controllability of the temperature in the reaction system during reaction and the controllability in the condensation/liquefaction treatment of the distillate, may possibly become poor.

In the dehydration reaction procedure using the above dehydration solvent, the dehydration solvent is used preferably in an amount of not less than 1% by mass and not more than 100% by mass with the total charged amount of the starting materials for production, namely alcohol and acid, being taken as 100% by mass. When the amount exceeds 100% by mass, the addition in excess will not produce any extra effect and, in addition, an increased amount of heat is required to maintain the reaction temperature at a constant level, which may possibly be disadvantage in economical viewpoint. An amount of not less than 2% by mass and not more than 50% by mass is more preferred.

In the above dehydration reaction step, the esterification reaction can be carried out by any of the batchwise and continuous reaction procedures. The batchwise procedure is preferred, however. The reaction conditions maybe those conditions under which the reaction can proceed smoothly. The reaction temperature is preferably not lower than 30° C. and not higher than 140° C., more preferably not lower than 60° C. and not higher than 130° C., still more preferably not lower than 90° C. and not higher than 120° C., most preferably not lower than 100° C. and not higher than 120° C. If it is lower than 30° C., the refluxing of the dehydration solvent will be slow and a longer time will be required for dehydration and, in addition, the reaction may not proceed smoothly. If it is higher than 140° C., some of the starting materials charged may decompose, hence the polymers obtainable from the esterification reaction product may be deteriorated in dispersing and thickening characteristics in various uses, for example cement dispersing ability, polymerization of the starting reactants or contamination of the distillate with the starting reactants may increase or the esterification product may possibly be deteriorated in performance characteristics or quality.

Under the above reaction conditions, the reaction time is preferably such that the conversion of not lower than 70% is attained, as mentioned later herein, more preferably not lower than 80%, still more preferably not lower than 98%. Normally, it is 1 to 100 hours, preferably 3 to 60 hours. As for the reaction pressure, the reaction may be carried out at ordinary pressure or under reduced pressure. From the equipment viewpoint, the reaction is preferably carried out at ordinary pressure, however.

Preferably, the above esterification reaction is carried out until a conversion of not lower than 70% is attained. If it is less than 70%, the yield of the product ester will be unsatisfactory and, in addition, the polymers for cement additives obtainable by using such product as a raw material for polymerization may possibly be deteriorated in performance characteristics required for the intended uses, namely the cement dispersing ability and so on. More preferably, it is not lower than 70% and not higher than 99%, still more preferably not lower than 80% and not higher than 98%. The above conversion is the ratio between the amount of the starting reactant alcohol as charged and the amount thereof at the time of completion of the reaction and is, for example, the value (%) calculated using the formula given below, following determination of respective peak areas by liquid chromatography (LC) under the conditions shown below:

Esterification percentage $(\%)=[(S-T)/S] \times 100$
S: Area measured for the alcohol charged
T: Area measured for the alcohol after completion of the esterification
Conversion Measuring Conditions
Analysis apparatus: Borwin (trademark), product of Nippon Bunko Co.
Detector: Differential refractometer (RI) detector (HITACHI 3350 RI MONITOR (trademark))
Eluent:
Species Acetonitrile/0.1% aqueous phosphoric acid solution=50/50 (% by volume) Flow rate 1.0 ml/min.
Column: Species ODS-120T+ODS-80Ts 4.6×250 mm (both being trademarks; products of Tosoh Corp.) Temperature 40° C.

When an acid catalyst is used in the dehydration reaction step in carrying out the production method of a chemical reactive substance according to the present invention, it is preferable to carry out a neutralization step for neutralizing the acid catalyst and (meth) acrylic acid. By doing so, the catalyst loses its activity and the dehydration reaction product obtained by the esterification reaction can be prevented from being hydrolyzed and the formation of impurities not to be involved in polymerization can be suppressed and, as a result, the polymers can be suppressed from being deteriorated in quality or performance characteristics.

The above neutralization step is preferably carried out by neutralizing the acid catalyst with a neutralizing agent after completion of the esterification reaction. The above neutralizing agent may be any agent capable of neutralizing the acid catalyst. Thus, there may be suitably mentioned alkali metal or alkaline earth metal hydroxides such as sodium hydroxide, potassium hydroxide, calcium hydroxide and lithium hydroxide; alkali metal or alkaline earth metal carbonates such as sodium carbonate, calcium carbonate and lithium carbonate; ammonia and amines such as monoethanolamine, diethanolamine and triethanolamine. These may be used singly or in combination of two or more. As the form of the neutralizing agent, the form of an alkaline aqueous solution is preferred.

In the above neutralization step, the acid catalyst and (meth) acrylic acid are neutralized and it is preferred that the amount of the neutralizing agent be selected so that the whole amount of the acid catalysts and some of (meth) acrylic acid can be neutralized. In this case, the portion of (meth) acrylic acid to be neutralized is preferably not more than 20% by mass, more preferably not less than 0.01% by mass and not more than 5% by mass with the amount of (meth) acrylic acid remaining after the esterification reaction being taken as 100% by mass. Among the acid catalyst and (meth) acrylic acid, the acid catalyst is higher in acid strength, hence the acid catalyst is first neutralized.

As regards the method of neutralization in the above neutralization step, when the esterification reaction is carried out in a dehydration solvent, it is preferable to add a large amount of water to the reaction system together with the alkali. This is because, in the absence of a large amount of water, the alkali, which is hardly soluble in the dehydration solvent, floats in a concentrated state in the reaction system and such floating of the high concentration alkali continues for a long period until the alkali has been consumed for neutralization, thus causing hydrolysis of the esterification product. In this case, the amount of addition of water may vary depending on the application form of the alkali but, when a 40 to 60% by mass of an alkaline aqueous solution is used as the neutralizing agent, for example, water is preferably added, in addition to the alkali aqueous solution, generally in an amount of not less than 5 parts by weight and not more than 1,000 parts by weight, more preferably not less than 10 parts by weight and not more than 100 parts by weight, per part by weight of the alkali aqueous solution. If the amount of water is less than 5 parts by weight, the alkali maybe unhomogeneous in the reaction system. If it exceeds 1,000 parts by weight, a separate neutralization vessel may be required to secure the productivity, leading to an increase in production cost.

The neutralization temperature in the above neutralization step is preferably not higher than 90° C., for instance, more preferably not lower than 0° C. and not higher than 80° C., still more preferably not lower than 25° C. and not higher than 65° C. At temperatures higher than 90° C., the neutralizing agent added may act as a hydrolyzing catalyst, possibly causing hydrolyzate formation in large amounts. At not higher than 80° C., hydrolyzates formation is sufficiently inhibited whereas, at lower than 0° C., the reaction mixture becomes viscous and the stirring becomes difficult accordingly and, in addition, a long period of time is required for increasing the temperature to a predetermined temperature for the removal of water by distillation after the reaction and/or it becomes necessary to provide a new cooling means (apparatus) for lowering the temperature below room temperature, whereby the production cost may possibly be increased.

The above dehydration solvent is preferably distilled off except for the case where the dehydration solvent is used for a polymerization step or the like. The method of distilling off the dehydration solvent in such a solvent removing step is not particularly restricted. For example, the dehydration solvent alone may be distilled off, or the solvent may be distilled off with an appropriate additive added. It is preferable, however, to use water and distill off the dehydration solvent azeotropically. In this case, no substantial amount of the acid catalyst or alkali remains in the reaction system owing to the neutralization step being carried out, so that even when water is added and the temperature is raised, no hydrolysis reaction takes place. By using such a method, the dehydration solvent can be removed efficiently at lower temperatures.

The conditions for the above method of distilling off are not particularly restricted provided that the dehydration solvent in the reaction system can appropriately be distilled off (evaporated). Generally, when water is used, the liquid temperature (at ordinary pressure) in the reaction vessel during distilling off the solvent, for instance, is preferably not lower than 80° C. and not higher than 120° C., more preferably not lower than 90° C. and not higher than 110° C. When water is not used, a temperature of not lower than 80° C. and not higher than 160° C. is generally preferred and a temperature of not lower than 90° C. and not higher than 150° C. is more preferred. In both of the above cases, a lower temperature than the above-specified range may fail to be a sufficient temperature (sufficient quantity of heat) to evaporate the dehydration solvent while, at a higher temperature than the above range, polymerization may be caused and a large quantity of heat may be consumed in evaporating a large amount of low-boiling-point starting materials. As for the pressure within the reaction vessel, the distillation may be carried out at ordinary pressure or under reduced pressure. From the equipment viewpoint, however, it is preferably carried out at ordinary pressure.

The apparatus system used in the dehydration reaction step is preferably used as the apparatus system in the above step of distilling off the solvent.

In the production method of a chemical reactive substance according to the present invention, an embodiment in which a liquid material containing a polyalkylene glycol monomer (I) and a carboxylic acid monomer (II) is copolymerized is now described.

As the above copolymerization method, known polymerization technology, such as solution polymerization, bulk polymerization and the like can be employed with a polymerization initiator, a chain transfer agent or a reducing agent, if necessary. In this case, a monomer(s) other than the essential monomers can also be copolymerized, if necessary. As such monomers, there may be suitably mentioned, unsaturated amides such as (meth)acrylamide and (meth)acrylalkylamides, vinyl esters such as vinyl acetate and vinyl propionate; unsaturated sulfonic acids such as vinylsulfonic acid, (meth)allylsulfonic acid, sulfoethyl (meth) acrylate, 2-methylpropanesulfonic acid (meth)acrylamide and styrenesulfonic acid, and monovalent metal salts, divalent metal salts, ammonium salts and organic amine salts thereof; aromatic vinyl compounds such as styrene and α-methylstyrene; esters of (meth) acrylic acid with $C_{1-18}$, preferably $C_{1-15}$, aliphatic alcohols or phenyl group-containing alcohols such as benzyl alcohol; polyalkylene glycol mono (meth) acrylates; polyalkylene glycol mono (meth)allyl ethers; and so forth.

As conditions for copolymerization in the above copolymerization, reaction temperature is preferably not lower than 30° C. and not higher than 120° C., more preferably not lower than 50° C. and not higher than 100° C. If the temperature is lower than 30° C., polymerization speed may possibly lowered, and if it is higher than 120° C., some of copolymerization products is decomposed to deteriorate dispersing ability or thickening property in various applications, such as cement dispersing ability or the like.

The chemical reactive substance containing a polycarboxylic acid obtainable by copolymerizing a liquid material containing a polyalkylene glycol monomer (I) and a carboxylic acid monomer (II), and/or a polycarboxylic acid obtainable by polymerizing a liquid material containing a carboxylic acid monomer (II) according to the present invention can suitably be applied as various polymers, namely polymers to be used as cement additives, builders for powder detergents, builders for liquid detergents, dispersants such as pigment dispersants for dispersing calcium carbonate, carbon black, ink and the like, scaling inhibitors, dispersants for gypsum-water slurries, dispersants for coal-water slurries (CWM) and thickening agents and other chemical products. Therefore, a polycarboxylic acid obtainable by copolymerizing a liquid material containing a polyalkylene glycol monomer (I) and a carboxylic acid monomer (II) which is produced by the above production method of a chemical reactive substance, and a polycarboxylic acid obtainable by polymerizing a liquid material containing a carboxylic acid monomer (II) which is produced by the above production method of a chemical reactive substance are useful in various applications. These polycarboxylic acids also constitute further aspects of the invention.

The above polycarboxylic acids are preferably polymers having a weight average molecular weight within a specific range. For example, the weight average molecular weight on the polyethylene glycol equivalent basis as determined by gel permeation chromatography (hereinafter, "GPC") under the measuring conditions given below is preferably, for example, not lower than 500 and not higher than 500,000. If it is less than 500, the water reducing capacity of the cement additives may decrease when the polycarboxylic acids are used as cement additives. If it exceeds 500,000, the water reducing capacity and slump loss preventing effects of the cement additives may decrease. More preferably, it is not higher than 300,000, and a range of not lower than 8,000 and not higher than 100,000 is most preferred.

The above GPC is constituted of an eluent storage tank, eluent feeding apparatus, automated sampler, column oven, column, detector, data processing machine and so forth. The molecular weight can be determined, for example by combinedly using the following commercial devices and selecting the measuring conditions:

Molecular Weight Measuring Conditions
Model: GPC-900 (trademark; product of Nippon Bunko Co.)
Detector: Differential refractometer (RI) detector (GPC-900, integrated type (trademark))
Eluent: A solution of 0.05 M sodium acetate in an acetonitrile/deionized water (40/60) mixture as adjusted to pH 6 with acetic acid is used. Eluent flow rate: 0.5 ml/min.
Columns: TSK-GEL guard column (inside diameter 6 mm, length 40 mm)+TSK-GEL G-4000 SWXL (inside diameter 7.8 mm, length 300 mm)+TSK-GEL G-3000 SWXL (inside diameter 7.8 mm, length 300 mm)+TSK-GEL G-2000 SWXL (inside diameter 7.8 mm, length 300 mm) (all being trademarks; products of Tosoh Corp.)

Column oven temperature: 40° C.

Working curve: The working curve varies according to the number of standard samples and the molecular weights thereof, the method of baseline drawing, the method of obtaining an approximate expression for the working curve and the like. Therefore, the following conditions are preferably established.

1. Standard Samples

Commercially available standard polyethylene oxide (PEO) and standard polyethylene glycol (PEG) are used as the standard samples. Preferably, the species having the following molecular weights are used as the standard samples: 1470, 4120, 7100, 11840, 18300, 22800, 32500, 50100, 74900, 120000, 205000, 288000 (12 points in total).

In selecting these standard samples, the following were taken into consideration:

(1) at least 7 standard samples having a molecular weight not less than 900 are included;
(2) at least one standard sample having a molecular weight between 900 and 2,000 is included;
(3) at least 3 standard samples having a molecular weight between 2,000 and 60,000 are included;
(4) at least one standard sample having a molecular weight of 200,000±30,000 is included; and
(5) at least one standard sample having a molecular weight of 270,000±30,000 is included.

2. Method of Baseline Drawing

Upper limit to molecular weight: A point where a peak appears from a horizontal and stable baseline.

Lower limit to molecular weight: A point where the main peak detection is finished.

3. Approximate Expression of the Working Curve

Based on the working curve ("elution time" versus "logarithm of molecular weight") constructed by using the above standard samples, a cubic approximate expression is derived and this is used in calculations.

The cement additives comprising the above-mentioned polycarboxylic acid can show good cement dispersing and slump maintaining capacities. If necessary, however, any of known cement additives (cement dispersants) other than the polycarboxylic acid may further be incorporated therein. There may also be incorporated with air entraining agents, cement wetting agents, expanding agents, water-proofing agents, retarders, quick setting agents, water-soluble high-molecular substances, thickening agents, flocculants, drying shrinkage reducing agents, reinforcing agents, accelerators, antifoaming agents and so forth. Thus-obtained cement additives are used in cement compositions comprising cement and water, for example in hydraulic cements such as portland cement, high belite content cement, high alumina cement or any of various cement blends, and in other hydraulic materials than cements such as gypsum. Such cement additives also constitute further aspect of the present invention. As polycarboxylic acids used for cement additives, polycarboxylic acids obtainable by copolymerizing the above polyalkylene glycol monomer (I) and the polycarboxylic acid monomer (II) are suitable.

The above cement additives produce excellent effects even at lower amount of addition into hydraulic materials as compared with the conventional cement additives. In adding to mortar or concrete in which hydraulic cement is used, for instance, they may be added, in the step of blending, in an amount of not less than 0.001% by mass and not more than 5% by mass relative to 100% by mass of cement. At an amount lower than 0.001% by mass, effects of the cement additive may not be fully produced. If the amount exceeds 5% by mass, no more substantial increase in effect will be obtained, which may be disadvantage in an economical viewpoint. An amount of not less than 0.01% by mass and not higher than 1% by mass is more preferred. Thereby, various effects can be produced, for example attainment of high water reducing percentage, improvements in slump loss preventing ability, reductions in water content per unit volume of concrete, increases in strength and improvements in durability.

The above polycarboxylic acids, which are possible to manifest excellent dispersing ability, can suitably be applied for such dispersants as builders for powder detergents or builders for liquid detergents. A dispersant, a builder for powder detergent and a builder for liquid detergent comprising the above polycarboxylic acid also constitute further aspects of the present invention. Suitable as the polycarboxylic acids used for such dispersants, builders for powder detergents or builders for liquid detergents are polycarboxylic acids obtainable by polymerizing the liquid material containing carboxylic acid monomers (II), and therefore, anti-gelling property, chelating ability and clay-dispersing ability in high hardness water can be manifested.

The above polycarboxylic acids are preferably polymers having a weight average molecular weight within a specific range. For example, when the polycarboxylic acids are used for dispersants, builders for powder detergents, or builders for liquid detergents, the weight average molecular weight on the polyethylene glycol equivalent basis as determined by GPC under the measuring conditions given above is preferably, for example, not lower than 1,000 and not higher than 1,000,000. If it is less than 1,000, or it exceeds 1,000,000, dispersing ability may be deteriorated. More preferably, it is not lower than 2,000 and not higher than 100,000, most preferably not lower than 3,000 and not higher than 80,000.

In the production method of a chemical reactive substance according to the present invention, an embodiment in which a liquid material containing a carboxylic acid monomer (II) is polymerized is now described.

The liquid material used in the production method of the present invention comprises the carboxylic acid monomer (II). The preferred form includes a form (1) containing (meth)acrylic acid (salt thereof) as a main component, a form (2) containing acrylic acid (salt thereof) and maleic acid (salt thereof) as main components, and a form (3) containing a monoethylenic unsaturated monomer comprising a polyether compound and a carboxylic acid monomer (II). The production method of the present invention is suitably applied in producing polycarboxylic acids by polymerizing such liquid materials.

In the above form (1), when the liquid material containing (meth)acrylic acid (salt thereof) as a main component is polymerized in the presence of a chain transfer agent and a polymerization initiator in an aqueous medium, it is preferred that a ratio between (a total amount of the monomer component, chain transfer agent and polymerization initiator in the liquid material) and (a total amount of the aqueous medium) be within a range of 46:54 to 66:34 in mass basis, that not less than 10% by mass of the total amount of aqueous medium and 0 to 50% by mass of the total amount of the chain transfer agent be charged in the reaction vessel in advance, not less than 70% by mass of the total amount of the monomer component, not less than 50% by mass of the chain transfer agent and not less than 80% by mass of the polymerization initiator be added sequentially to the reaction system of a temperature of 50 to 120° C., and polymerization be carried out at a reaction temperature within the range of 50 to 120° C. Thereby, polycarboxylic acids excellent in anti-gelling property and chelating property which can suitably be used as dispersants such as builders for powder or liquid detergents can be produced.

In the above form (1), the term "contain (meth)acrylic acid (salt thereof) as a main component" means (meth) acrylic acid (salt thereof) accounts for not less than 50% by mass, preferably not less than 60% by mass, more preferably not less than 90% by mass, still more preferably not less than 100% by mass with the monomer component in the liquid material being taken as 100% by mass.

In the above form (1), polymers having high chelating ability can be obtained by increasing the proportion of (meth)acrylic acid (salt thereof) in the monomer component of the liquid material. As (meth)acrylic acid (salt thereof), there maybe mentioned acrylic acid (salt thereof) monomers such as acrylic acid, acrylic acid monovalent metal salts, e.g. sodium acrylate and potassium acrylate, ammonium acrylate, acrylic acid divalent metal salts, e.g. magnesium acrylate and calcium acrylate; and methacrylic acid (salt thereof)monomers such as methacrylic acid, methacrylic acid monovalent metal salts, e.g. sodium methacrylate and potassium methacrylate, ammonium methacrylate, methacrylic acid divalent metal salts, e.g. magnesium methacrylate and calcium methacrylate. These may be used independently or two or more species may be used in combination. Among these, acrylic acid (salt thereof) monomers are preferred and acrylic acid is particularly preferred.

The monomer component in the liquid material according to the above form (1) can contain other monomer(s) copolymerizable with the above (meth) acrylic acid (salt thereof) monomer as far as the effects of the invention are not deteriorated. As such monomers, there may suitably mentioned unsaturated monocarboxylic acid monomers such as crotonic acid; neutralized products obtainable by neutralizing the above unsaturated monocarboxylic acid monomers partially or completely with a monovalent metal, a divalent metal, ammonia, a protonated organic amine, or the like; unsaturated dicarboxylic acid monomers such as maleic acid, fumaric acid, itaconic acid, citraconic acid, and the like; neutralized products obtainable by neutralizing the above unsaturated dicarboxylic acid monomers partially or completely with a monovalent metal, a divalent metal, ammonia, a protonated organic amine, or the like; amide monomers such as (meth)acrylamide, t-butyl (meth) acrylamide and the like; hydrophobic monomers such as (meth)acrylic acid esters, styrene, 2-methylstyrene, vinyl acetate and the like; unsaturated sulfonic acid monomers such as vinylsulfonic acid, allylsulfonic acid, methallylsulfonic acid, styrenesulfonic acid, 2-acrylamide-2-methylpropanesulfonic acid, 3-allyloxyl-2-hydroxypropanesulfonic acid, sulfoethyl (meth)acrylate, sulfopropyl (meth)acrylate, 2-hydroxysulfopropyl (meth) acrylate, sulfoethylmaleimide, and the like; neutralized products obtainable by neutralizing the above unsaturated sulfonic acid monomers partially or completely with a monovalent metal, a divalent metal, ammonia, a protonated organic amine, or the like; hydroxyl group-containing unsaturated monomers such as 3-methyl-2-butene-1-ol (prenol), 3-methyl-3-butene-1-ol (isoprenol), 2-methyl-3-butene-2-ol (isoprene alcohol), 2-hydroxyethyl (meth)acrylate, polyethylene glycol mono(meth)acrylate, polypropylene glycol mono(meth)acrylate, polyethylene glycol monoisoprenol ether, polypropylene glycol monoisoprenol ether, polyethylene glycol monoallyl ether, polypropylene glycol monoallyl ether, glycerol monoallyl ether, α-hydroxy acrylic acid, N-methylol (meth) acrylamide, glycerol mono (meth) acrylamide, vinyl alcohol, and the like; cationic monomers such as dimethylaminoethyl (meth)acrylate, dimethylaminopropyl (meth)acrylamide and the like; nitryl monomers such as (meth) acrylonitryl, and the like; and phospho-containing monomers such as (meth)acrylamide methanephosphonic acid, (meth)acrylamide methyl methanephosphonate, 2-(meth)acrylamide-2-methylpropanephosphonic acid, and the like. These may be used independently, or two or more species may be used in combination. The term "monomer component" basically means each monomer component mentioned above, however, when 1 mole of acrylic acid and 1 mole of sodium hydroxide are used, for example, 1 mole of sodium acrylate is obtained by neutralization, therefore this sodium acrylate is considered as a monomer component. When 1 mole of acrylic acid and 0.5 mole of sodium hydroxide are used, a mixture composed of 0.5 mole of acrylic acid and 0.5 mole of sodium acrylate is obtained by neutralization, and this mixture is considered as a monomer component.

As the above polymerization initiator, there may suitably mentioned hydrogen peroxide; peroxosulfates such as ammonium peroxosulfate, sodium peroxosulfate, potassium peroxosulfate; azo compounds such as 2,2'-azobis(2-amidinopropane) 2-hydrochloride, 4,4'-azobis-(4-cyanovaleric acid), 2,2'-azobisisobutyronitrile, 2,2'-azobis-(4-methoxy-2,4-dimethylvaleronitryl), and the like; and organic peroxides such as bonzoyl peroxide, lauroyl peroxide, peracetic acid, persuccinic acid, di-t-butyl peroxide, t-butylhydroperoxide, cumene hydroperoxide, and the like. These may be used independently or two or more species may be used in combination. Among these, peroxosuifates are preferably used. As the amount of use of the polymerization initiator relative to the monomer component in the liquid material, the amount of 0.0001 to 0.05 mole relative to one mole of monomer component is suitable. The polymerization can be facilitated by using such a reducing agent as (bi)sulfite, transition metal salts, and the like with the above polymerization initiator.

As the above chain transfer agents, there may suitably mentioned sulfur-containing compounds such as thioglycolic acid, thioacetic acid, mercaptoethanol, and the like; phosphorous compounds such as phosphorous acid, sodium hydrogenphosphite, and the like; phosphinic compounds such as phosphinic acid, sodium hypophosphite, and the like; and alcohol compounds such as methanol, ethanol, isopropyl alcohol, butanol and the like. These may be used independently or two or more species may be used in combination. Among these, phosphinic acids are more preferred and sodium hypophosphite is particularly preferred. The amount of use of the chain transfer agent relative to the monomer component is suitably 0.005 to 0.15 mole relative to one mole of the monomer component.

As the above aqueous medium, water alone; and mixed solutions of water and a water-soluble solvent are suitable. As the water-soluble solvent, there may suitably mentioned lower alcohols such as methanol, ethanol, isopropyl alcohol, butanol, and the like; lower ketones such as acetone, methyl ethyl ketone, and the like; and lower ethers such as dimethyl ether, methyl ethyl ether, and the like. The ratio of water in the mixed solution is preferably not less than 40% by mass, and water alone is particularly preferred. However, "aqueous medium" includes all components dissolved in water other than the monomer component, the chain transfer agent and the polymerization initiator and calculation is carried out based on this. For example, when 1 mole of sodium hydroxide is used relative to 0.5 mole of acrylic acid, 0.5 mole of sodium acrylate is obtained and 0.5 mole of sodium hydroxide is remained. This 0.5 mole of sodium hydroxide is dissolved in water so that it is included in aqueous medium and calculated, however. Moreover, water formed upon neutralization between acrylic acid and sodium hydroxide and the like is included in "aqueous medium" and calculated. When sodium hypophosphite hydrate is used as the chain transfer agent, water of hydration is included in chain transfer agent and calculated.

In the above form (1), the ratio of (total amount of the monomer component, chain transfer agent and polymerization initiator in the liquid material):(total amount of aqueous medium) is preferably within a range of 46:54 to 66:34, more preferably within the range of 48:52 to 64:36, still more preferably within the range of 50:50 to 60:40, in mass basis.

In the above form (1), "charge raw materials (monomer component, chain transfer agent, polymerization initiator and aqueous medium) into the reaction vessel in advance" means to put starting materials into the reaction vessel before raising the temperature of the reaction system. On the other hand, temperature of the reaction system upon successive feeding of the starting materials is preferably 50 to 120° C., more preferably 60 to 115° C., still more preferably 90 to 110° C. If the temperature is lower than 50° C., ultra-high-molecular-weight components are formed, thereby anti-gelling property may markedly deteriorated. If it exceeds 120° C., ultra-low molecular-weight components are formed, thereby polymers having high chelating ability may not possibly be obtained. The manner of successive feeding of starting materials to the reaction system may be continuous or stepwise.

When the desired polycarboxylic acid is polycarboxylate, the method which comprises polymerizing a monomer component containing (meth) acrylic acid as a main component followed by neutralization with an alkaline agent (e.g. sodium hydroxide) (this method is sometimes called as "acid type") is preferred than the method which comprises polymerizing (meth) acrylate as a monomer component (this method is sometimes called as "salt type"), since the former method can give polymers having narrow molecular weight distribution.

The polycarboxylic acids obtainable by the production method according to the above form (1) have excellent anti-gelling ability and chelating ability, and can be suitably applied for dispersants such as builders for powder or liquid detergents. When such carboxylic acids are used as dispersants such as builders for powder or liquid detergents, product (A×B) of anti-gelling ability (A) and chelating ability(B) is preferably not less than 18,000. Moreover, polycarboxylic acids which are obtainable by polymerizing the monomer component containing not less than 90% by mass of (meth) acrylic acid (salt thereof) monomer in the monomer component in the liquid materials as well as have weight average molecular weight of 1,000 to 100,000 are preferred.

In the above form (2), polycarboxylic acids (acrylic acid (salt thereof)-maleic acid (salt thereof) copolymer) are produced by polymerizing a liquid material containing acrylic acid (salt thereof) and maleic acid (salt thereof) as main components in the presence of at least a polymerization initiator in an aqueous medium. In this case, the liquid material, polymerization initiator, aqueous medium and other starting material(s) used where necessary are preferably used in such amount that theoretical solid concentration of the polymer at the completion of polymerization is not less than 40% by mass, the amount of use of acrylic acid (salt thereof) and maleic acid (salt thereof) are preferably within the range of 95 to 30/5 to 70 in molar ratio, and as the polymerization initiator, it is preferred that, though not particularly restricted, (1) peroxosulfate and hydrogen peroxide are used in combination, (2) peroxosulfate and bisulfite are used in combination, or (3) hydrogen peroxide and polyvalent metal ion are used in combination. Thereby, polycarboxylic acids which have high clay-dispersing ability in high hardness water and high calcium ion trapping ability and can suitably applied for dispersants such as builders for powder or liquid detergents can be obtained.

In the above form (2), "contain acrylic acid (salt thereof) and maleic acid (salt thereof) as main components" means the total amount of acrylic acid (salt thereof) and maleic acid (salt thereof) accounts for not less than 85 mole percent, preferably not less than 90 mole percent, more preferably not less than 95 mole percent, in the monomer component in the liquid material.

As the above acrylic acid (salt thereof), any of acrylic acid, acrylate and mixture of these may be used, but acrylic acid is preferably used. As acrylates, acrylic acid (salt thereof) monomers mentioned hereinabove are suitable. When peroxosulfate and bisulfite are used in combination as the polymerization initiator, as mentioned herein later, degree of neutralization at the completion of dropping is preferably not more than 15 mole percent, more preferably not more than 10 mole percent of the total amount of acrylic acid and maleic acid. When hydrogen peroxide and polyvalent metal ion are used in combination as the polymerization initiator, degree of neutralization at the completion of dropping is preferably not more than 30 mole percent, more preferably not more than 20 mole percent of the total amount of acrylic acid and maleic acid. Neutralization may be carried out before feeding thereof to the reaction vessel in advance, or carried out in the reaction vessel by feeding an acid and a base separately into the reaction vessel.

As the above maleic acid (salt thereof), any of maleic anhydride, maleic acid and maleate may be used and mixture of two or more of them may also be used. As maleates, such salts as alkali metal hydroxides, e.g. sodium hydroxide, potassium hydroxide, and the like, ammonia, protonated organic amines, e.g. monoethanolamine, and the like are suitable. When peroxosulfate and bisulfite are used in combination as the polymerization initiator, as mentioned herein later, degree of neutralization of maleic acid is preferably 5 to 30 mole percent, more preferably 10 to 25 mole percent. When hydrogen peroxide and polyvalent metal ion are used in combination as the polymerization initiator, degree of neutralization of maleic acid is arbitrary, but 10 to 50 mole percent is preferable. Neutralization may be carried out before feeding thereof to the reaction vessel in advance, or carried out in the reaction vessel by feeding an acid and a base separately into the reaction vessel.

As the amount of use of the above acrylic acid (salt thereof) and maleic acid (salt thereof), molar ratio between acrylic acid (salt thereof) and maleic acid (salt thereof) is preferably 95 to 30/5 to 70, more preferably 90 to 60/10 to 40. When the amount of use of maleic acid (salt thereof) is less than the above range, calcium ion trapping ability may possibly decrease. When the amount of use of acrylic acid (salt thereof) is less than the above range, clay-dispersing ability in high hardness water may possibly decrease.

The liquid material used in the above form (2) may contain monomer(s) other than acrylic acid (salt thereof) and maleic acid (salt thereof) as far as effects of the invention is not deteriorated. Such monomers may be those copolymerizable with acrylic acid (salt thereof) or maleic acid (salt thereof) and one or two or more species of those mentioned hereinabove can be suitably used.

As the above polymerization initiator, it is preferred to use (1) peroxosulfate and bisulfite in combination and/or (2) hydrogen peroxide and polyvalent metal ion in combination. Thereby, copolymers which have clay-dispersing ability in high hardness water of not less than 50% and calcium ion trapping ability of not less than 270 mg CaCO$_3$/g can be obtained. Further, other polymerization initiator(s) may be use in combination within such range that effects of the invention are not deteriorated.

The ratio between the amount of use of the above peroxosulfate and the amount of use of bisulfite is preferably 1/0.5 to 1/5, more preferably 1/1 to 1/2, in mass basis. The total amount of use of peroxosulfate and bisulfite is preferably 5 to 15 g, more preferably 10 to 15 g, relative to one mole of the monomer component.

When hydrogen peroxide and polyvalent metal ion are used in combination as the above polymerization initiator, the amount of use of hydrogen peroxide is preferably 5 to 15 g, more preferably 8 to 12 g, relative to one mole of the monomer component.

As the above polyvalent metal ion, one or two or more species of iron ions ($Fe^{2+}$, $Fe^{3+}$), vanadium ions ($V^{2+}$, $V^{3+}$, $VO^{2+}$) and copper ion ($Cu^{2+}$) may preferably be used, andiron ions are particularly preferred. The form of polyvalent metal ions upon feeding is not particularly restricted, and metals that are ionized in the polymerization reaction system and/or metal compounds can be used. For example, there may suitably mentioned water-soluble metal salts such as vanadium oxytrichloride, vanadium trichloride, vanadium oxalate, vanadium sulfate, vanadic anhydride, ammonium metavanadate, hypovanadous ammonium sulfate (($NH_4$)$_2SO_4 \cdot VSO_4 \cdot 6H_2O$), vanadous ammonium sulfate (($NH_4$)V($SO_4$)$_2 \cdot 12H_2O$), copper (II) acetate, copper (II) bromide, copper (II) acetylacetate, copper (II) chloride, copper carbonate, copper (II) citrate, copper (II) formate, copper (II) hydroxide, copper (II) oleate, copper maleate, copper phosphate, copper(II) sulfate, acetylacetonato iron, ammonium iron citrate, ammonium iron (III) oxalate, ammonium iron (II) sulfate, ammonium iron (III) sulfate, iron citrate, iron fumarate, iron maleate, iron (II) lactate, iron (III) nitrate, pentacarbonyl iron, iron (III) phosphate, iron (III) pyrophosphate, and the like; metal oxides such as vanadium pentaoxide, copper (II) oxide, iron (II) oxide, iron (III) oxide, and the like; and metal sulfites such as copper (II) sulfite, iron sulfite, and the like. The polyvalent metal ion is preferably used so as to attain 5 to 500 ppm, more preferably 10 to 400 ppm, relative to the total amount of the reaction solution.

The aqueous medium is preferably used as the above polymerization solvent. Particularly, the aqueous medium comprising not less than 80% by mass of water and less than 20% by mass of organic solvent is preferred, and water is more preferred. The organic solvents used in the aqueous medium are the same as those mentioned hereinabove.

As polymerization conditions in the above form (2), temperature is preferably not lower that 80° C., more preferably temperature in the vicinity of boiling point of the polymerization solvent. Pressure may be any of ordinary pressure (atmospheric pressure), increased pressure and reduced pressure. When peroxosulfate and bisulfite are used in combination as the polymerization initiator as mentioned above, pH during polymerization is preferably not higher than 5, more preferably not higher than 4. If pH during polymerization exceeds 5, molecular weight tends to be increased and not preferable.

Polycarboxylic acids obtainable by the production method according to the above form (2) have high clay-dispersing ability and high calcium ion trapping ability in high hardness water, hence they can suitably be used as dispersants such as builders for powder or liquid detergents.

In the above form (3), a polyether compound is preferably subjected to graft polymerization with a monoethylenic unsaturated monomer comprising carboxylic acid monomer (II) in the presence of organic peroxide and at least one acidic substance selected from among organic sulfonic acid compounds, phosphoric acid compounds and inorganic acids. Thereby, polycarboxylic acids which have high graft percentage, namely are highly pure hydrophilic graft polymer, and can be used as dispersants such as builders for powder or liquid detergents can be obtained.

As the above polyether compounds, those having the number average molecular weight of not less than 200 and having not less than 30 mole percent in total of a repeating unit represented by the following general formula are preferred;

in the formula, R represents at least one species among a hydrogen atom and a methyl group and may be occurred as mixed species in the molecular.

The polyether compound is obtainable by polymerizing a cyclic ether comprising ethylene oxide and/or propylene oxide and other alkylene oxide(s), if necessary, by known method in the presence of the compound to be reacted which serves a polymerization initiating point. Other alkylene oxides used for obtaining the polyether compounds are not particularly restricted and one or two or more species can be used. The copolymerizable other alkylene oxide(s) preferably accounts for less than 70 mole percent of total. If it accounts for not less than 70 mole percent, graft percentage of the monoethylenic unsaturated monomer may decrease.

The above compound to be reacted is the compound which serves the polymerization initiating point for the cyclic ether and species and molecular weight thereof are not particularly restricted. There may be suitably mentioned water; hydrogen; oxygen; carbon dioxide; alcohols; hydrogen halides; ammonia; amines; hydroxylamines; carboxylic acids; halogenated acids; lactones; aldehydes; benzenes, and one or two or more of these may be used. Among these, at least one species selected from among water, alcohols and amines is preferred as the compound to be reacted.

The above polyether compounds may be derivatives derived from polyether obtainable by the above-mentioned polymerization. As such derivatives, terminal group modified products resulting from modifying the terminal function group of polyether, and crosslinked compound obtainable by reacting polyether with a crosslinking agent having a plurality of such group as carboxyl, isocyanate, amino and halogen are suitable. As the terminal group modified products, those obtainable by esterifying at least one terminal hydroxyl group of the above polyether with fatty acids of 2 to 22 carbon atoms and acid anhydrides thereof, such as acetic acid and acetic anhydride, and/or dicarboxylic acids such as succinic acid, succinic anhydride, adipic acid and the like.

The number of repeating units in the above polyether compound is preferably not less than 2, more preferably not less than 3 in the polyether compound. At least one of a plurality of R in repeating units is preferably a hydrogen atom.

The above monoethylenic unsaturated monomer comprises the carboxylic acid monomer (II) and further comprises other unsaturated monomer (s) copolymerizable with the carboxylic acid monomer (II), in some cases.

When the above carboxylic acid monomer (II) is at least one species selected from among (meth) acrylic acid, maleic acid, fumaric acid and maleic anhydride, an acid value and dispersing ability of the hydrophilic graft polymer will be increased, hence it is preferable. As other unsaturated monomers copolymerizable with the carboxylic acid monomer (II), one or two or more species of those mentioned hereinabove can be used. The proportion of the carboxylic acid monomer (II) in the monoethylenic unsaturated monomer is preferably not less than 60% by mass, still more preferably not less than 65% by mass, most preferably not less than 70% by mass, considering to increase the acid value and dispersing ability of the polycarboxylic acid.

The above organic peroxides are used as the polymerization initiators in graft polymerization. As such organic peroxide, one or two or more species of those mentioned hereinabove can be used. The amount of use of the organic peroxide is preferably 0.1 to 30% by mass, more preferably 0.5 to 20% by mass, relative to the monoethylenic unsaturated monomer. Decomposition catalysts of organic peroxides or reducing compounds may be used in combination with the organic peroxide.

The above acidic substance has such functions as improving graft percentage to the polyether compound and increasing dispersing ability of the resulting polycarboxylic acid (hydrophilic graft polymer). The acidic substance is at least one species selected from among organic sulfonic acid compounds, phosphoric acid compounds and inorganic acids. The organic sulfonic acid compound suitably includes aliphatic sulfonic acids such as methanesulfonic acid, ethanesulfonic acid, propanesulfonic acid, octanesulfonic acid, and the like; aromatic sulfonic acids such as benzenesulfonic acid, benzene disulfonic acid, naphthalenesulfonic acid, naphthalene disulfonic acid, and the like; nuclear substituting group-containing aromatic sulfonic acids such as chlorobenzene sulfonic acid, 1-nephthylamine-4-sulfonic acid (naphthionic acid), Tobias acid, peri acid, γ acid, J acid, Koch acid, metanilic acid, toluenesulfonic acid, dodecylbenzenesulfonic acid, and the like. One or two or more species of them can be used.

As the above inorganic acids, hydrochloric acid, hydrofluoric acid, hydrobromic acid, hydroiodic acid, perchloric acid, chlorous acid, periodic acid, sulfuric acid, fuming sulfuric acid, sulfurous acid, nitric acid, fuming nitric acid, manganic acid, permanganic acid, chromic acid, bichromic acid, and the like are suitable, and one or two or more species of them can be used. As phosphoric acid compounds, phosphoric acid, phosphorous acid, phosphinic acid, polyphosphoric acid, metaphosphoric acid, pyrophosphoric acid, methyl phosphate, ethyl phosphate, propyl phosphate, butyl phosphate, octyl phosphate, dodecyl phosphate, stearyl phosphate, phenyl phosphate, dimethyl phosphate, diethyl phosphate, dipropyl phosphate, dibutyl phosphate, dioctyl phosphate, didodecyl phosphate, distearyl phosphate, diphenyl phosphate, and the like are preferred and one or two or more species of them can be used.

The amount of use of the above acidic substance is preferably 0.05 to 20% by mass, more preferably 0.1 to 15% by mass relative to the monoethylenic unsaturated monomer. The acidic substance may be added to the polyether compound in advance, or may be added to the monoethylenic unsaturated monomer.

The above graft polymerization is preferably carried out under substantially no existence of solvent, but not more than 20% by mass of the solvent in whole reaction system may be used. If the amount of solvent exceeds 20% by mass, graft percentage of the monoethylenic unsaturated monomer may decrease in some cases. When viscosity of the reaction system is high, small amount of the solvent may preferably be used upon addition and the solvent may be distilled off after addition.

The above solvents are preferably those having chain transfer coefficient of the monomer used to the solvent as small as possible, and those being usable for the reaction under ordinary pressure and having a boiling point of not lower than 80° C. As such solvents, there may suitably be mentioned alcohols such as iso-butyl alcohol, n-butyl alcohol, tert-butyl alcohol, ethylene glycol, diethylene glycol, triethylene glycol, propylene glycol, ethylene glycol monoalkyl ether, propylene glycol monoalkyl ether, and the like; diethers such as ethylene glycol dialkyl ether, propylene glycol dialkyl ether, and the like; acetic acid compounds such as acetic acid, acetic acid esters, e.g. ethyl acetate, propyl acetate, butyl acetate, acetic acid ester of ethylene glycol monoalkyl ether, acetic acid ester of propylene glycol monoalkyl ether, and the like are preferred, and one or two or more of them can be used. Suitable as the alkyl groups in the above alcohols and diethers are methyl, ethyl, propyl and butyl groups.

The temperature for the above graft polymerization is preferably not lower than 80° C., more preferably 90 to 160° C. If the temperature is lower than 80° C., graft polymerization is hardly proceeded and graft percentage of the monoethylenic unsaturated monomer may tend to be decreased. If it exceeds 160° C., thermal decomposition of the polyether compounds and the resulting hydrophilic graft polymers may occur.

In the above graft polymerization, it is preferred that the polyether compound be partially or totally charged at the start of the polymerization. When at least one monomer (A) selected from the group consisting of maleic acid, fumaric acid and maleic anhydride, and (meth)acrylic acid are used in combination and subjected to graft polymerization to the polyether compound, it is preferred that not less than half amount of the monomer (A) and the acidic substance are admixed to the polyether compound in advance, heated to not lower than 80° C., and that graft polymerization is carried out by adding the monoethylenic unsaturated monomer and the organic peroxide separately to the residual heated mixture. By this manner, molecular weight of the resulting hydrophilic graft polymer can be easily controlled.

The polycarboxylic acids obtainable by the production method of the above form (3) have high purity and high dispersing ability, therefore can suitably be used as dispersants such as builders for powder or liquid detergents.

EXAMPLES

The following Examples describe the present invention in more detail, but the present invention is not limited only to these Examples. In the following, "%" means "% by weight", unless specified.

Example 1

A reaction vessel with an external jacket (capacity: 30 m$^3$) equipped with a thermometer, a stirrer, a water separator, and a condenser was charged with 16,500 kg of methoxypoly (n=25) ethylene glycol, 4,740 kg of methacrylic acid, 235 kg of para-toluenesulfonic acid hydrate, 5 kg of phenothiazine, and 1,060 kg of cyclohexane. The temperature of the jacket attached to the reaction vessel was set to 135° C. using steam of 0.2 MPa, and fine regulation was properly given, if needed. Thus esterification reaction was carried out at a reaction temperature of 110 to 120° C. When methoxypoly (n=25)ethylene glycol and methacrylic acid were charged, a material injection nozzle of a structure as shown in FIG. 2(A) was used, and thus residual liquid of the methoxypoly (n=25)ethylene glycol in the material injection nozzle was extruded into the reaction vessel by the purge procedure mentioned above using methacrylic acid and nitrogen gas. After it was confirmed that an esterification percentage had reached to 99% in about 20 hours, 135 kg of 49% sodium hydroxide aqueous solution and 4,890 kg of water were added, and the paratoluenesulfonic acid was neutralized. Subsequently, 8 kg of hydroquinone was added, the temperature was raised and cyclohexane was distilled off by azeotropic distillation with water. After cyclohexane was distilled off, water was added and 80% aqueous solution of an esterified compound (1) was obtained as a product (monomer solution). Although such batch operation was carried out repeatedly, the blockade of the material injection nozzle was not observed. Moreover, no gelled matter in the product (monomer solution) was observed.

Example 2

Except that residual liquid in the material injection nozzle of methoxypoly (n=25) ethylene glycol was extruded into the reaction vessel using only nitrogen gas when methoxypoly (n=25)ethylene glycol and methacrylic acid were charged, the same procedure as in Example 1 was otherwise repeated. After 20 batches were performed successively, gelled matter blocked about ½ of the diameter of the material injection nozzle. Moreover, an amount of gelled matter in the monomer began to increase after about 20 batches finished, and a blockade started to occur at the transfer of the product about 100 g/batch (monomer 26 t).

Example 3

Except that residual liquid in the material injection nozzle of methoxypoly (n=25)ethylene glycol was extruded into the reaction vessel using 50 kg of water when methoxypoly (n=25)ethylene glycol and methacrylic acid were charged, the same procedure as in Example 1 was otherwise repeated, and then no blockade of the material injection nozzle was observed. Moreover, no gelled matter in the product (monomer solution) was observed.

Comparative Example 1

Except that residual liquid in the material injection nozzle was not removed when methoxypoly (n=25)ethylene glycol and methacrylic acid were injected, the same procedure as in Example 1 was otherwise repeated. In this case, gelled matter blocked not less than about ½ of a diameter of the material injection nozzle after about 5 to 6 batches finished. Moreover, since the gelled matter formed at the time of a starting material injection might be fallen into the reaction vessel, it did not result in a state of a full blockade, but the gelled matter hung down in a shape of an icicle was presented. Moreover, an amount of gelled matter in the monomer began to increase after about 5 to 6 batches finished, and a blockade started to occur at the transfer of the product of about 500 g to 1 kg/batch (monomer 26 t).

Example 4

A reaction vessel equipped with a thermometer, a stirrer and a condenser (capacity: 30 m$^3$) was charged with 8,250 kg of pure water, purged with nitrogen and raised to 80° C. with stirring. While keeping the temperature at 80° C., 13,100 kg of the monomer solution synthesized in Example 1, an ammonium peroxosulfate aqueous solution prepared by dissolving 125 kg of ammonium peroxosulfate in 1,000 kg of pure water and a mercaptopropionic acid aqueous solution prepared by dissolving 100 kg of mercaptopropionic acid in 600 kg of pure water were independently added thereto dropwise over 4 hours for the monomer solution and the mercaptopropionic acid aqueous solution, and over 5 hours for the ammonium peroxosulfate aqueous solution, respectively, in successive manner. Immediately after completion of dropping, 100 kg of pure water was injected through the monomer solution nozzle to wash the nozzle. Then, the reaction solution was maintained at 80° C. for 1 hour, thereby polymerization was completed. The polymer was obtained by cooling and neutralization followed thereafter.

No gelled matter was adhered in the monomer solution dropping nozzle or the vicinity thereof.

Example 5

A reaction vessel equipped with a thermometer, a stirrer and a condenser (capacity: 12 m$^3$) was charged with 2, 000 kg of pure water and 6,900 kg of 80% isoprenol 50-EO adduct (herein after, abbreviated as "IPN-50") aqueous solution. Immediately after the completion of injection, the 80% IPN-50 aqueous solution dropping nozzle was blew with nitrogen gas to thereby extrude the residual liquid within the nozzle into the reaction vessel. The reaction vessel was further purged with nitrogen and raised to 60° C. under stirring.

While keeping the temperature of 60° C., a hydrogen peroxide aqueous solution prepared by diluting 15 kg of 35% hydrogen peroxide with 230 kg of pure water was injected. Within 2 hours after the hydrogen peroxide was injected, 345 kg of acrylic acid, an aqueous solution prepared by dissolving 6 kg of L-ascorbic acid in 415 kg of pure water and an aqueous solution prepared by dissolving 15 kg of mercaptopropionic acid in 745 kg of pure water were independently added thereto dropwise over 3 hours for acrylic acid, and over 3.5 hours for L-ascorbic acid aqueous solution and mercaptopropionic acid aqueous solution, respectively, in successive manner. Immediately after the completion of dropping, 100 kg of pure water was injected through the acrylic acid nozzle and the nozzle was blew with nitrogen gas, thereby the nozzle was washed. The reaction solution was maintained at 60° C. for 2 hours thereafter to complete the polymerization. The polymer was obtained by cooling and neutralization followed thereafter.

No gelled matter was adhered in the IPN-50 aqueous solution dropping nozzle or the acrylic acid dropping nozzle or the vicinity thereof.

Example 6

A reaction vessel made of SUS equipped with a thermometer, a stirrer, and a condenser (capacity: 6 m$^3$) was charged with 782.5 kg of pure water and the temperature was raised up to 90° C. under agitation. Subsequently, 2,137.5 kg of 80% acrylic acid aqueous solution, 317.5 kg of 37% sodium acrylate aqueous solution, 333.5 kg of 15% sodium persulfate aqueous solution, and 357 kg of 35% sodium bisulfite aqueous solution respectively were dropped into the polymerization reaction system kept at 90° C. through independent dropping nozzles under agitation. Each dropping time was 180 minutes. The dropping nozzles of 80% acrylic acid aqueous solution and 37% sodium acrylate were washed off by injecting 50 kg of deionized water immediately after the completion of dropping.

Reaction solution was kept at 90° C. for 30 more minutes after the completion of dropping, and polymerization was completed. The resulting acrylic acid polymer had weight average molecular weight of 5,800, molecular weight distribution of 2.4, acidic value of 8.0, solid content of 53%, and degree of neutralization of 5%. Then, 48% sodium hydroxide was injected and pH was adjusted to 8.

No gelled matter originating in acrylic acid was adhered in and around the dropping nozzles of 80% acrylic acid aqueous solution and 37% sodium acrylate.

Example 7

A reaction vessel made of SUS equipped with a thermometer, a stirrer, and a condenser (capacity: 6 m$^3$) was charged with 620 kg of deionized water and 800 kg of maleic anhydride (947.4 kg as maleic acid), and then 1,416.6 kg of 48 mass % sodium hydroxide aqueous solution (referred to as 48% NaOHaq hereinafter) was further added under agitation. Then, a temperature was raised up to boiling point under agitation of the aqueous solution in the reactor.

Next, 900 kg of 80 mass % acrylic acid aqueous solution, 228.6 kg of 35 mass % hydrogen peroxide solution, 333.4 kg of 15 mass % sodium persulfate aqueous solution, and 66.6 kg of deionized water were dropped through separate nozzles respectively under agitation. At this time, 80% acrylic acid aqueous solution was dropped over 120 minutes, dropping of 35% hydrogen peroxide aqueous solution was started simultaneously with dropping of 80% acrylic acid aqueous solution, and was dropped over 50 minutes, and 15 mass % sodium persulfate aqueous solution and deionized water were dropped over 80 minutes after the completion of dropping of 35% hydrogen peroxide aqueous solution. The dropping nozzle of 80% acrylic acid aqueous solution was washed by injection of 50 kg deionized water immediately after the completion of dropping of 80% acrylic acid aqueous solution. The reaction solution was kept at boiling point for 20 more minutes after completion of all droppings, and polymerization was completed.

Thus, acrylic acid-maleic acid copolymer having a weight average molecular weight of 13,000 was obtained. The solid content was 50%. Then, 48% sodium hydroxide was injected and pH was adjusted to 8.

No gelled matter originating in acrylic acid was adhered in and around the dropping nozzle of 80% acrylic acid aqueous solution.

Example 8

A reactor vessel made of SUS equipped with a thermometer, a stirrer, and a condenser (capacity: 12 m$^3$) was charged with 4,540 kg of methoxypoly (n=25) ethylene glycol and 350 kg of maleic anhydride, the reaction solution was heated and melted under nitrogen current, and the temperature was raised up to 130° C. under agitation.

Next, temperature was kept at 130° C.±5° C., and 1,170 kg of acrylic acid and 80 kg of di-t-butyl peroxide were separately dropped over two hours in successive manner. The nozzle was washed by injection of 100 kg of pure water through the acrylic acid dropping nozzle immediately after the completion of acrylic acid dropping. Then, the reaction solution was kept at 130° C. over 80 minutes, and polymerization was completed. Then the mixture was cooled and polymer was obtained.

No gelled matter originating in acrylic acid was adhered in and around the dropping nozzle of acrylic acid.

Example 9

A reaction vessel made of SUS equipped with a thermometer, a stirrer, and a condenser (capacity: 12 m$^3$) was charged with 2,580 kg of pure water, 878 kg of maleic anhydride, and 0.24 kg of Mohr's salt, and a temperature was raised up to 95° C. under agitation after substitution with nitrogen.

Then, while keeping temperature at 95° C., a mixed solution prepared by adding 1,200 kg of pure water to 3,000 kg of isoprenol 10-EO adduct (abbreviated as "IPN-10" hereinafter), 1,206 kg of 80% acrylic acid aqueous solution and, and 2,088 kg of 4.8% hydrogen peroxide aqueous solution were separately dropped over two hours in successive manner, respectively. Immediately after the completion of dropping, 100 kg of pure water was injected through 80% acrylic acid aqueous solution dropping nozzle and IPN-10/pure water mixed solution dropping nozzle, respectively, and thus the nozzles were washed. Then, reaction solution was kept at 95° C. over 60 minutes, and polymerization was completed. Then the mixture was cooled and polymer was obtained.

No gelled matter was adhered in and around the 80% acrylic acid aqueous solution dropping nozzle and the IPN-10/pure water mixed solution dropping nozzle.

When polymers prepared in Examples 6 and 7 were used as builders for powder detergents, they produced good dispersing ability. When polymers prepared in Examples 8 and 9 were used as builders for liquid detergents, they produced good dispersing ability.

Industrial Application

The production method of a chemical reactive substance of the present invention, which has the above-mentioned constitution, can prevent solidification and gel formation and the resulting blockage within a material injection nozzle, as well as contamination of the reaction system with the gelled matter, and can suppress occurrence of problems on a production process due to the gelled matter to thereby production a chemical reactive substance with stable quality is afforded, when the chemical reactive substances are produced by injecting the liquid material containing a reactive substance having unsaturated double bonds into the reaction vessel through the material injection nozzle of the reaction vessel. Therefore, it is a useful method in order to produce cement additives (cement dispersants), builders for powder detergents, builders for liquid detergents, dispersants, for example pigment dispersants for dispersing calcium carbonate, carbon black and ink, scale inhibitors, dispersants for gypsum and water slurries, dispersants for coal water slurries (CWM), thickeners and other chemical products.

What is claimed is:

1. A production method of a chemical reactive substance which comprises injecting a liquid material containing a reactive substance having an unsaturated double bond into a reaction vessel through a material injection nozzle of said reaction vessel and causing a reaction at a reaction temperature of not less than 50° C.,
said production method of the chemical reactive substance including a step of removing at least a part of residual liquid remained in the material injection nozzle from inside of the material injection nozzle.

2. A production method of a chemical reactive substance containing a polycarboxylic acid
which comprises carrying out copolymerization of a liquid material containing a polyalkylene glycol monomer (I) and a carboxylic acid monomer (II) in a reaction vessel, said polyalkylene glycol monomer (I) and said carboxylic acid monomer (II) being injected, individually or as a mixed solution, into the reaction vessel through a material injection nozzle of said reaction vessel, and said production method of the chemical reactive substance including a step of removing at least a part of residual liquid remained in the material injection nozzle from inside of the material injection nozzle.

3. A production method of a chemical reactive substance containing a polycarboxylic acid which comprises carrying out polymerization of a liquid material containing a carboxylic acid monomer (II) in a reaction vessel, said carboxylic acid monomer (II) being injected into the reaction vessel through a material injection nozzle of said reaction vessel, and said production method of the chemical reactive substance including a step of removing at least a part of residual liquid remained in the material injection nozzle from inside of the material injection nozzle.

4. A production method of a chemical reactive substance containing a polyalkylene glycol monomer (I)

which comprises carrying out esterification of a liquid material containing a carboxylic acid monomer (II) and a polyalkylene glycol (III) in a reaction vessel, said carboxylic acid monomer (II) and said polyalkylene glycol (III) being injected, individually or as a mixed solution, into the reaction vessel through a material injection nozzle of said reaction vessel, and said production method of the chemical reactive substance including a step of removing at least a part of residual liquid remained in the material injection nozzle from inside of the material injection nozzle.

5. The production method of a chemical reactive substance according to claim 1, wherein the substance removed from inside of the material injection nozzle in said step is polyalkylene glycol (III).

6. The production method of a chemical reactive substance according to claim 1, wherein said step is carried out by purging and extruding at least a part of residual liquid in the material injection nozzle from the material injection nozzle using a gaseous substance.

7. The production method of a chemical reactive substance according to claims 1, wherein said step is carried out by purging and extruding at least a part of residual liquid in the material injection nozzle from the material injection nozzle using water.

8. The production method of a chemical reactive substance according to claims 1, wherein said step is carried out by purging and extruding at least a part of the residual liquid in the material injection nozzle from the material injection nozzle using a starting material other than said material injected through the material injection nozzle.

9. A polycarboxylic acid obtainable by copolymerizing a liquid material containing a polyalkylene glycol monomer (I) and a carboxylic acid monomer (II), which is produced by the production method of a chemical reactive substance according to claims 1.

10. A polycarboxylic acid obtainable by polymerizing a liquid material containing a carboxylic acid monomer (II), which is produced by the production method of a chemical reactive substance according to claims 1.

11. A cement additive comprising the polycarboxylic acid according to claim 9.

12. A dispersant comprising the polycarboxylic acid according to claim 9.

13. A builder for a powder detergent comprising the polycarboxylic acid according to claim 9.

14. A builder for a liquid detergent comprising the polycarboxylic acid according to claim 9.

15. The production method of a chemical reactive substance according to claim 2, wherein the substance removed from inside of the material injection nozzle in said step is polalylene glycol (III).

16. The production method of a chemical reactive substance according to claim 3, wherein the substance removed from inside of the material injection nozzle in said step is polalylene glycol (III).

17. The production method of a chemical reactive substance according to claim 4, wherein the substance removed from inside of the material injection nozzle in said step is polalylene glycol (III).

18. The production method of a chemical reactive substance according to claim 2, wherein said step is carried out by purging and extruding at least a part of residual liquid in the material injection nozzle from the material injection nozzle using gaseous substance.

19. The production method of a chemical reactive substance according to claim 3, wherein said step is carried out by purging and extruding at least a part of residual liquid in the material injection nozzle from the material injection nozzle using gaseous substance.

20. The production method of a chemical reactive substance according to claim 2, wherein said step is carried out by purging and extruding at least a part of residual liquid in the material injection nozzle from the material injection nozzle using water.

* * * * *